US012179807B2

(12) United States Patent
Austrheim

(10) Patent No.: US 12,179,807 B2
(45) Date of Patent: Dec. 31, 2024

(54) AUTOMATED STORAGE SYSTEM

(71) Applicant: Autostore Technology AS, Nedre Vats (NO)

(72) Inventor: Trond Austrheim, Etne (NO)

(73) Assignee: AutoStore Technology AS, Nedre Vats (NO)

(*) Notice: Subject to any disclaimer, the term of this patent is extended or adjusted under 35 U.S.C. 154(b) by 918 days.

(21) Appl. No.: 17/058,680

(22) PCT Filed: Jun. 11, 2019

(86) PCT No.: PCT/EP2019/065236
§ 371 (c)(1),
(2) Date: Nov. 25, 2020

(87) PCT Pub. No.: WO2019/238697
PCT Pub. Date: Dec. 19, 2019

(65) Prior Publication Data
US 2021/0198041 A1    Jul. 1, 2021

(30) Foreign Application Priority Data

Jun. 12, 2018   (NO) .................................... 20180813
Jul. 19, 2018   (NO) .................................... 20181005
(Continued)

(51) Int. Cl.
*B61B 13/00*   (2006.01)
*B60W 50/00*   (2006.01)
(Continued)

(52) U.S. Cl.
CPC ............ *B61B 13/00* (2013.01); *B65G 1/0414* (2013.01); *B65G 1/0457* (2013.01);
(Continued)

(58) Field of Classification Search
CPC ..... B65G 1/1378; B65G 1/0464; B65G 1/065
See application file for complete search history.

(56) References Cited

U.S. PATENT DOCUMENTS 2,842,876 A * 7/1958 Chicoine ................ G07B 15/04
                                                    194/902
3,519,150 A    7/1970 Keena et al.
(Continued)

FOREIGN PATENT DOCUMENTS

CA         22576512       12/2000
CA         2988122 A1     12/2016
(Continued)

OTHER PUBLICATIONS

United States Office Action in related U.S. Appl. No. 16/972,482, mailed Mar. 22, 2022 (46 pages).
(Continued)

*Primary Examiner* — Timothy R Waggoner
(74) *Attorney, Agent, or Firm* — Baker Botts L.L.P.

(57) ABSTRACT

The present invention provides a storage system (1) comprising a storage grid structure (104) and multiple container handling vehicles (200,300), the storage grid structure comprises vertical column profiles (102) defining multiple storage columns (105), in which storage containers (106) can be stored one on top of another in vertical stacks (107), and at least one transfer column (119,120), the column profiles are interconnected at their upper ends by top rails (110,111) forming a horizontal top rail grid (108) upon which the container handling vehicles (200,300) may move in two perpendicular directions, the container handling vehicles are able to retrieve storage containers (106) from, and store storage containers in, the storage columns (105), and transport the storage containers on the storage grid structure, wherein the storage grid structure (104) comprises at least one horizontal transfer section (2); and the storage system (Continued)

comprises multiple container transfer vehicles (6) and a transfer floor (5) on which the container transfer vehicles (6) may move horizontally, and the transfer section (2) is arranged at a level below the top rail grid (108) and extends from an external side (12) of the storage grid structure (104) to a position below the at least one transfer column (119, 120) and comprises at least a section of the transfer floor (5); and each of the container transfer vehicles comprises a container carrier (38) for carrying a storage container (106) and a wheel arrangement (32a,32b) for moving the container transfer vehicle (6) in at least two perpendicular directions on the transfer floor (5); and wherein the at least one transfer column (119,120) extends from the top rail grid (108) to the transfer section (2), such that a storage container (106) may be transferred between the top rail grid (108) and the container carrier of one of the container transfer vehicles (6).

19 Claims, 12 Drawing Sheets

(30) Foreign Application Priority Data

Aug. 2, 2018 (NO) .................................. 20181039
Dec. 4, 2018 (NO) .................................. 20181563

(51) Int. Cl.
| | | |
|---|---|---|
| B65G 1/04 | (2006.01) | |
| B65G 1/06 | (2006.01) | |
| B65G 1/137 | (2006.01) | |
| B65G 43/00 | (2006.01) | |
| B65G 47/06 | (2006.01) | |
| B65G 47/52 | (2006.01) | |
| B65G 57/03 | (2006.01) | |
| B65G 63/00 | (2006.01) | |
| B65G 63/06 | (2006.01) | |
| B65G 65/23 | (2006.01) | |
| B65G 67/24 | (2006.01) | |
| B66F 9/06 | (2006.01) | |
| B66F 9/19 | (2006.01) | |
| G05D 1/00 | (2024.01) | |

(52) U.S. Cl.
CPC ......... *B65G 1/0464* (2013.01); *B65G 1/0471* (2013.01); *B65G 1/0478* (2013.01); *B65G 1/0485* (2013.01); *B65G 1/0492* (2013.01); *B65G 1/065* (2013.01); *B65G 1/1375* (2013.01); *B65G 47/06* (2013.01); *B65G 47/52* (2013.01); *B65G 57/03* (2013.01); *B65G 63/06* (2013.01); *B65G 65/23* (2013.01); *B65G 67/24* (2013.01); *B66F 9/063* (2013.01); *B66F 9/19* (2013.01); *G05D 1/0011* (2013.01); *G05D 1/021* (2013.01); *G05D 1/0291* (2013.01); *B60W 50/0098* (2013.01); *B60W 2710/06* (2013.01); *B60W 2720/10* (2013.01); *B60W 2720/24* (2013.01); *B65G 1/1378* (2013.01); *B65G 43/00* (2013.01); *B65G 63/004* (2013.01); *B65G 2201/0235* (2013.01); *B65G 2201/0258* (2013.01); *B65G 2203/0283* (2013.01); *B65G 2203/042* (2013.01); *G05D 1/02* (2013.01); *G05D 1/0229* (2013.01); *G05D 1/0231* (2013.01); *G05D 1/0259* (2013.01); *G05D 1/0289* (2013.01)

(56) References Cited

U.S. PATENT DOCUMENTS

| | | |
|---|---|---|
| 3,800,963 A | 4/1974 | Holland |
| 4,538,950 A | 9/1985 | Shiomi et al. |
| 4,909,697 A | 3/1990 | Bernard, II et al. |
| 5,078,566 A | 1/1992 | Ferrence |
| 5,360,306 A | 11/1994 | Nakayama et al. |
| 5,538,809 A | 7/1996 | Bittihn et al. |
| 7,101,139 B1 | 9/2006 | Benedict |
| 8,628,289 B1 | 1/2014 | Benedict et al. |
| 9,527,669 B1 | 12/2016 | Hanssen et al. |
| 2003/0093176 A1 | 5/2003 | Ohtsuka et al. |
| 2005/0047895 A1 | 3/2005 | Lert |
| 2005/0118003 A1 | 6/2005 | Mitchell et al. |
| 2007/0293978 A1* | 12/2007 | Wurman ............. G06Q 10/087 700/213 |
| 2008/0014062 A1 | 1/2008 | Yuyama et al. |
| 2011/0027059 A1 | 2/2011 | Benedict et al. |
| 2012/0189409 A1* | 7/2012 | Toebes ................. B65G 1/0492 414/273 |
| 2012/0282068 A1 | 11/2012 | Tschurwald et al. |
| 2014/0014470 A1 | 1/2014 | Razumov |
| 2014/0086714 A1 | 3/2014 | Malik |
| 2014/0277693 A1 | 9/2014 | Naylor |
| 2014/0288696 A1 | 9/2014 | Lert |
| 2014/0292274 A1 | 10/2014 | Dorval et al. |
| 2014/0311858 A1 | 10/2014 | Keating et al. |
| 2015/0127143 A1 | 5/2015 | Lindbo et al. |
| 2016/0060033 A1 | 3/2016 | Izumi |
| 2016/0060037 A1 | 3/2016 | Razumov |
| 2016/0137435 A1 | 5/2016 | Tanaka et al. |
| 2016/0145058 A1* | 5/2016 | Lindbo ................ B65G 1/0457 700/218 |
| 2016/0176638 A1 | 6/2016 | Toebes |
| 2016/0325932 A1 | 11/2016 | Hognaland |
| 2017/0050809 A1 | 2/2017 | Itoh et al. |
| 2017/0057745 A1 | 3/2017 | Ueda et al. |
| 2017/0166400 A1 | 6/2017 | Hofmann |
| 2017/0253430 A1 | 9/2017 | Buzan et al. |
| 2018/0044110 A1 | 2/2018 | Clarke et al. |
| 2018/0065804 A1 | 3/2018 | Hognaland |
| 2018/0068253 A1 | 3/2018 | Simms et al. |
| 2018/0082162 A1 | 3/2018 | Durham et al. |
| 2018/0086573 A1 | 3/2018 | Lindbo |
| 2018/0118078 A1 | 5/2018 | Alkhaldi et al. |
| 2018/0141754 A1 | 5/2018 | Garrett et al. |
| 2018/0150793 A1 | 5/2018 | Lert, Jr. et al. |
| 2018/0214439 A1* | 8/2018 | Converso ................ A61P 25/18 |
| 2019/0375588 A1* | 12/2019 | Lindbo ................ B65G 1/0464 |
| 2020/0148474 A1 | 5/2020 | Salichs et al. |
| 2022/0097966 A1* | 3/2022 | Brady .................. B65G 1/1378 |

FOREIGN PATENT DOCUMENTS

| | | |
|---|---|---|
| CH | 507418 | 5/1971 |
| CN | 101553416 A | 10/2009 |
| CN | 101711210 A | 5/2010 |
| CN | 102050333 A | 5/2011 |
| CN | 102992012 A | 3/2013 |
| CN | 104066661 A | 9/2014 |
| CN | 104781163 A | 7/2015 |
| CN | 104885106 A | 9/2015 |
| CN | 105383848 A | 3/2016 |
| CN | 105517923 A | 4/2016 |
| CN | 105899398 A | 8/2016 |
| CN | 105947514 A | 9/2016 |
| CN | 106064718 A | 11/2016 |
| CN | 106241154 A | 12/2016 |
| CN | 106414278 A | 2/2017 |
| CN | 106575391 A | 4/2017 |
| CN | 106660703 A | 5/2017 |
| CN | 106662874 A | 5/2017 |
| CN | 106829298 | 6/2017 |
| CN | 106829298 A | 6/2017 |
| CN | 206790852 U | 12/2017 |
| CN | 108140168 A | 6/2018 |

(56) References Cited

FOREIGN PATENT DOCUMENTS

| | | |
|---|---|---|
| DE | 40 16 810 C1 | 11/1991 |
| DE | 9310690 U1 | 9/1993 |
| DE | 102009017241 | 10/2010 |
| DE | 102013009340 | 12/2014 |
| EP | 0133472 | 2/1985 |
| EP | 0458021 | 11/1991 |
| EP | 0458021 A1 | 11/1991 |
| EP | 0534558 A1 | 3/1993 |
| EP | 2881905 A1 | 6/2015 |
| EP | 3003932 A1 | 4/2016 |
| EP | 3288865 A1 | 3/2018 |
| GB | 1267751 A | 3/1972 |
| GB | 1276160 A | 6/1972 |
| GB | 2106070 A | 4/1983 |
| GB | 2211822 | 7/1989 |
| GB | 2233319 A | 1/1991 |
| GB | 2557379 | 6/2018 |
| JP | S60-137703 A | 7/1985 |
| JP | S6417707 A | 1/1989 |
| JP | S6485656 A | 3/1989 |
| JP | H06-043936 A | 2/1994 |
| JP | H07-067623 B2 | 7/1995 |
| JP | H08-217209 A | 8/1996 |
| JP | H09152914 A | 6/1997 |
| JP | H11-143538 A | 5/1999 |
| JP | 2000044010 | 2/2000 |
| JP | 2000-191106 A | 7/2000 |
| JP | 2003-137406 A | 5/2003 |
| JP | 2009184775 A | 8/2009 |
| JP | 2009-541177 A | 11/2009 |
| JP | 2011-102166 A | 5/2011 |
| JP | 2015-535517 A | 12/2015 |
| JP | 2017088404 A | 5/2017 |
| JP | 2017-524625 A | 8/2017 |
| KR | 20170026074 A | 3/2017 |
| NO | 317366 B1 | 10/2004 |
| RU | 2008111257 A | 10/2009 |
| WO | 96/14258 A1 | 5/1996 |
| WO | 2005/077789 A1 | 8/2005 |
| WO | 2010064989 | 6/2010 |
| WO | 2012/026824 A1 | 3/2012 |
| WO | 2012083060 | 6/2012 |
| WO | 2012106746 A1 | 8/2012 |
| WO | 2014/075937 A1 | 5/2014 |
| WO | 2014075937 | 5/2014 |
| WO | 2014090684 | 6/2014 |
| WO | 2014195901 | 12/2014 |
| WO | 2014195901 A1 | 12/2014 |
| WO | 2014203126 | 12/2014 |
| WO | 2015084236 A1 | 6/2015 |
| WO | 2015/140216 A1 | 9/2015 |
| WO | 2015/170660 A1 | 11/2015 |
| WO | 2015193278 | 12/2015 |
| WO | 2015193278 A1 | 12/2015 |
| WO | 2016/166323 A1 | 10/2016 |
| WO | 2016166294 | 10/2016 |
| WO | 2016172793 A1 | 11/2016 |
| WO | 2016/198467 A1 | 12/2016 |
| WO | 2016/198565 A1 | 12/2016 |
| WO | 2016196815 | 12/2016 |
| WO | 2016196815 A1 | 12/2016 |
| WO | 2016198467 | 12/2016 |
| WO | 2017-081281 A1 | 5/2017 |
| WO | 2017081273 A1 | 5/2017 |
| WO | 2017/121512 A1 | 7/2017 |
| WO | 2017/121515 A1 | 7/2017 |
| WO | 2017144054 | 8/2017 |
| WO | 2017/153563 A1 | 9/2017 |
| WO | 2017/211596 A1 | 12/2017 |
| WO | 2017211640 | 12/2017 |
| WO | 2017220651 | 12/2017 |
| WO | 2018/162757 A1 | 9/2018 |
| WO | 2018/163753 A1 | 9/2018 |
| WO | 2018/189106 A1 | 10/2018 |

OTHER PUBLICATIONS

Office Action in counterpart Chinese Patent Application No. 201980038106.1 issued on Sep. 8, 2021 (6 pages).
Office Action in counterpart Chinese Patent Application No. 201980039028.7 issued on Oct. 27, 2021 (15 pages).
Office Action in counterpart Chinese Patent Application No. 201980039046.5 issued on Sep. 15, 2021 (18 pages).
Office Action in counterpart Chinese Patent Application No. 201980039068.1 issued on Sep. 15, 2021 (23 pages).
Office Action in the counterpart Japanese Applicaiton No. 2020-568712, mailed Jun. 26, 2023 (7 pages).
Notification of Reasons for Rejection issued in Japanese Application No. 2020-568727, mailed on Mar. 30, 2023 (8 pages).
Office Action in counterpart Chinese Patent Application No. 2019800538763 issued on Dec. 6, 2021 (13 pages).
Office Action in counterpart Chinese Patent Application No. 2019800393798 issued on Dec. 9, 2021 (17 pages).
Office Action issued in Chinese Application No. 2019800388569 mailed on Oct. 19, 2021 (16 pages).
Office Action issued in Chinese Application No. 201980037162.3; Dated Sep. 27, 2021 (8 pages).
Extended European Search Report issued in European Application No. 21186410.3, dated Nov. 25, 2021 (5 pages).
Office Action issued in the counterpart Chinese Patent Application No. 201980037723X, mailed on Sep. 17, 2021 (25 pages).
Office Action issued in the counterpart Chinese Patent Application No. 2019800383353, mailed on Dec. 17, 2021 (3 pages).
Office Action issued in the counterpart Chinese Patent Application No. 201980039066.2, mailed on Sep. 10, 2021 (10 pages).
Search issued in the counterpart chinese Patent Application No. 201980039066.2, mailed on Sep. 6, 2021 (3 pages).
"Mobile Robot" OMRON Industrial Automation; Retrieved on Dec. 7, 2021 from the Internet: URL: http://indusrial.omron.co.uk/en/producs/mobile-robot#technology> (2 pages).
ISR of Sep. 12, 2019 in PCT/EP2019/065153, cited inter alia as statement of relevance for any non-Engligh ref cited therein.
NOSR of Jun. 6, 2019 in NO20181039, cited inter alia as statement of relevance for any non-Engligh ref cited therein.
NOSR of Feb. 6, 2019 in NO20181005, cited inter alia as statement of relevance for any non-Engligh ref cited therein.
ISR of Sep. 12, 2019 in PCT/EP2019/065236, cited inter alia as statement of relevance for any non-Engligh ref cited therein.
NOSR of Apr. 11, 2019 in NO20181563, cited inter alia as statement of relevance for any non-Engligh ref cited therein.
Office Action issued in counterpart Japanese Patent Application No. 2020-569128 mailed on Jul. 3, 2023 (6 pages).
Office Action issued in counterpart Japanese Patent Application No. 2020-568698 mailed on May 29, 2023 (9 pages).
Office Action issued in counterpart Japanese Patent Application No. 2020-569140 mailed on Jun. 2, 2023 (5 pages).
Office Action issued in counterpart Japanese Patent Application No. 2020-568714 mailed on Jul. 3, 2023 (16 pages).
Office Action issued in counterpart Japanese Patent Application No. 2020-568805 mailed on Jun. 5, 2023 (7 pages).
Office Action issued in the European Application No. 19730155.9, mailed Sep. 4, 2023 (6 pages).

\* cited by examiner

AUTOMATED STORAGE SYSTEM

FIELD OF THE INVENTION

The present invention relates to an automated storage and retrieval system and a method for use of an automated storage and retrieval system.

BACKGROUND

FIGS. 1A and 2B disclose a typical prior art automated storage and retrieval system 1 with a framework structure 100. FIGS. 1B and 2B disclose prior art container handling vehicles 200,300 operating in the system 1 disclosed in FIGS. 1A and 2A, respectively.

The framework structure 100 defines a storage grid 104 comprising a plurality of upright members 102 and optionally a plurality of horizontal members 103 supporting the upright members 102. The members 102, 103 may typically be made of metal, e.g. extruded aluminium profiles.

The storage grid 104 comprises multiple grid columns 112, and each grid column is defined by four of the upright members 102. A large majority of the grid columns are also termed storage columns 105, in which storage containers 106, also known as bins, are stacked one on top of another to form stacks 107.

Each storage container 106 may typically hold a plurality of product items (not shown), and the product items within a storage container 106 may be identical or may be of different product types depending on the application.

The storage grid 104 guards against horizontal movement of the of storage containers 106 in the stacks 107, and guides vertical movement of the containers 106, but does normally not otherwise support the storage containers 106 when stacked. Guiding of the vertical movement of the storage containers is obtained by having the upright members 102 featuring four corner sections, wherein each corner section is arranged to accommodate a corner of a storage bin, as disclosed in for instance NO317366.

The automated storage and retrieval system 1 comprises a rail system 108 (or a top rail grid) arranged in a grid pattern across the top of the storage grid 104, on which rail system 108 a plurality of container handling vehicles 200,300 (as exemplified in FIGS. 1B and 2B) are operated to raise storage containers 106 from, and lower storage containers 106 into, the storage columns 105, and also to transport the storage containers 106 above the storage columns 105. The horizontal extent of one of the grid cells 122 constituting the grid pattern is in FIGS. 1A and 2A marked by thick lines.

Each grid cell 122 has a width which is typically within the interval of 30 to 150 cm, and a length which is typically within the interval of 50 to 200 cm. Each grid opening 115 has a width and a length which is typically 2 to 10 cm less than the width and the length of the grid cell 122 due to the horizontal extent of the rails 110,111.

The rail system 108 comprises a first set of parallel rails 110 arranged to guide movement of the container handling vehicles 200,300 in a first direction X across the top of the frame structure 100, and a second set of parallel rails 111 arranged perpendicular to the first set of rails 110 to guide movement of the container handling vehicles 200,300 in a second direction Y which is perpendicular to the first direction X. In this way, the rail system 108 defines the upper ends of the grid columns 112 above which the container handling vehicles 200,300 can move laterally, i.e. in a plane which is parallel to the horizontal X-Y plane. Commonly, at least one of the sets of rails 110,111 is made up of dual-track rails allowing two container handling vehicles to pass each other on neighbouring grid cells 122. Dual-track rails are well-known and disclosed in for instance WO 2015/193278 A1 and WO 2015/140216 A1, the contents of which are incorporated herein by reference.

Each prior art container handling vehicle 200,300 comprises a vehicle body and a wheel arrangement of eight wheels 201,301, wherein a first set of four wheels enable the lateral movement of the container handling vehicles 200,300 in the X direction and a second set of the remaining four wheels enable the lateral movement in the Y direction. One or both sets of wheels in the wheel arrangement can be lifted and lowered, so that the first set of wheels and/or the second set of wheels can be engaged with the respective set of rails 110, 111 at any one time.

Each prior art container handling vehicle 200,300 also comprises a lifting device (not shown) for vertical transportation of storage containers 106, e.g. raising a storage container 106 from, and lowering a storage container 106 into, a storage column 105. The lifting device comprises one or more gripping/engaging devices (not shown) which are adapted to engage a storage container 106, and which gripping/engaging devices can be lowered from the vehicle 201,301 so that the position of the gripping/engaging devices with respect to the vehicle 201,301 can be adjusted in a third direction Z which is orthogonal the first direction X and the second direction Y.

Conventionally, and also for the purpose of this application, Z=1 identifies the uppermost layer of the grid 104, i.e. the layer immediately below the rail system 108, Z=2 the second layer below the rail system 108, Z=3 the third layer etc. In the prior art storage grid disclosed in FIGS. 1A and 2A, Z=8 identifies the lowermost, bottom layer of the grid 104. Consequently, as an example, and using the Cartesian coordinate system X, Y, Z indicated in FIGS. 1A and 2B, the storage container identified as 106' in FIG. 1 can be said to occupy grid location or cell X=10, Y=2, Z=3. The container handling vehicles 200,300 can be said to travel in layer Z=0 and each grid column can be identified by its X and Y coordinates.

Each container handling vehicle 200 comprises a storage compartment or space (not shown) for receiving and stowing a storage container 106 when transporting the storage container 106 across the top of the storage grid 104. The storage space may comprise a cavity arranged centrally within the vehicle body, e.g. as is described in WO2014/090684A1, the contents of which are incorporated herein by reference.

Alternatively, the container handling vehicles 300 may have a cantilever construction as described in NO317366, the contents of which are also incorporated herein by reference.

The container handling vehicles 200 may have a footprint, i.e. an extent in the X and Y directions, which is generally equal to the horizontal area of a grid cell 122, i.e. the extent of a grid cell 122 in the X and Y directions, e.g. as is described in WO2015/193278A1, the contents of which are incorporated herein by reference.

Alternatively, the container handling vehicles 200 may have a footprint which is larger than the horizontal area of a grid cell 122, e.g. as is disclosed in WO2014/090684A1.

In a storage grid 104, a majority of the grid columns 112 are storage columns 105, i.e. grid columns where storage containers 106 are stored in stacks 107. However, a grid 104 normally has at least one grid column 112 which is not used for storing storage containers 106, but is arranged at a location wherein the container handling vehicles 200,300 can drop off and/or pick up storage containers 106 so that they can be transported to a second location (not shown) where the storage containers 106 can be accessed from outside of the grid 104 or transferred out of or into the grid 104. Within the art, such a location is normally referred to as a "port" and the grid column at which the port is located may be referred to as a transfer column 119,120. The drop-off and pick-up ports are the upper ends/openings of a respective transfer column 119,120.

The prior art storage grids 104 in FIGS. 1A and 2A comprise two transfer columns 119 and 120. The first transfer column 119 may for example comprise a dedicated drop-off port where the container handling vehicles 200,300 can drop off storage containers 106 to be transported through the transfer column 119 and further to e.g. a picking/stocking station, and the second transfer column 120 may comprise a dedicated pick-up port where the container handling vehicles 200,300 can pick up storage containers 106 that have been transported through the transfer column 120 from e.g. a picking/stocking station. A storage container may be transported through a transfer column by use of the lifting device of a container handling vehicle 200,300 or by use of a storage container lift arranged in the transfer column. Each of the ports of the first and second transfer column may be suitable for both pick-up and drop-off of storage containers.

The second location may typically be a picking/stocking station, wherein product items are removed from and/or positioned into the storage containers 106. In a picking/stocking station, the storage containers 106 are normally never removed from the automated storage and retrieval system 1 but are returned into the storage grid 104 once accessed.

For monitoring and controlling the automated storage and retrieval system 1, e.g. monitoring and controlling the location of respective storage containers 106 within the storage grid 104; the content of each storage container 106; and the movement of the container handling vehicles 200,300 so that a desired storage container 106 can be delivered to the desired location at the desired time without the container handling vehicles 200,300 colliding with each other, the automated storage and retrieval system 1 comprises a computerized control system (not shown) which typically comprises a database for keeping track of the storage containers 106.

A conveyor system comprising conveyor belts or rollers is commonly employed to transport the storage containers from a lower end of the transfer columns 119,120 to e.g. a picking/stocking station.

A conveyor system may also be arranged to transfer storage containers between different storage grids, e.g. as is described in WO2014/075937A1, the contents of which are incorporated herein by reference.

Further, WO2016/198467A1, the contents of which are incorporated herein by reference, discloses an example of a prior art access system having conveyor belts (FIGS. 5a and 5b in WO2016/198467A1) and a frame mounted rail (FIGS. 6a and 6b in WO2016/198467A1) for transporting storage containers between transfer columns and stations where operators can access the storage containers.

When a storage container 106 stored in the storage grid 104 disclosed in FIG. 1A is to be accessed, one of the container handling vehicles 200,300 is instructed to retrieve the target storage container 106 from its position in the grid 104 and transport it to or through the transfer column 119. This operation involves moving the container handling vehicle 200,300 to a grid location above the storage column 105 in which the target storage container 106 is positioned, retrieving the storage container 106 from the storage column 105 using the container handling vehicle's lifting device (not shown), and transporting the storage container 106 to the transfer column 119. If the target storage container 106 is located deep within a stack 107, i.e. with one or a plurality of other storage containers positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle 200,300 that is subsequently used for transporting the target storage container 106 to the transfer column, or with one or a plurality of other cooperating container handling vehicles 200,300. Alternatively, or in addition, the automated storage and retrieval system 1 may have container handling vehicles 200,300 specifically dedicated to the task of temporarily removing storage containers 106 from a storage column 105. Once the target storage container 106 has been removed from the storage column 105, the temporarily removed storage containers can be repositioned into the original storage column 105. However, the removed storage containers may alternatively be relocated to other storage columns 105.

When a storage container 106 is to be stored in the grid 104, one of the container handling vehicles 200,300 is instructed to pick up the storage container 106 from the transfer column 120 and to transport it to a grid location above the storage column 105 where it is to be stored. After any storage containers positioned at or above the target position within the storage column stack 107 have been removed, the container handling vehicle 200,300 positions the storage container 106 at the desired position. The removed storage containers may then be lowered back into the storage column 105 or relocated to other storage columns 105.

A problem associated with known automated storage and retrieval systems 1 is that the area surrounding the pick-up and drop-off ports may become congested with container handling vehicles 200,300 instructed to drop off or pick up storage containers 106. This may seriously impede the operation of the automated storage and retrieval system 1. In small systems this situation may possibly be alleviated by adding further transfer columns to the grid, as this will allow the container handling vehicles 200,300 to be distributed among a larger number of ports of transfer columns in order to avoid congestion. However, if further ports and columns are added, the number of picking/stocking stations as well as the conveyor system infrastructure must be increased. This requires space, which may not necessarily be available. Also, adding conveyor system infrastructure and additional picking/stocking stations is costly.

In the prior art solutions for transfer of storage containers out of or into the storage grid, the ports and the respective transfer columns 119,120 are required to be arranged at a grid column 112 in/at the periphery of the storage grid, or the ports are arranged at an extension of the rail system 108 extending beyond the grid columns 112 at the periphery of the storage grid 104. Examples of such prior art solutions are disclosed in for instance WO 2014/203126 A1, WO 2012/026824 A1, WO 2016/198467 A1 and WO 2017/211596 A1. This requirement entails that the number of transfer columns 119,120 and any associated structure for storage container handling, such as picking/stocking stations, are restricted by the available space at the periphery of the storage grid. Further, by having the transfer columns 119,120 arranged at or outside the periphery of the storage grid, the container handling vehicles are often required to travel long distances upon the storage grid to reach the closest port. The latter is a hindrance to obtaining an optimum efficiency, in particular when operating large storage grids, wherein the distance from a centre section of the storage grid to the periphery is long.

A further issue with the prior art solutions is the lack of flexibility regarding the handling of storage containers exiting or entering the storage grid. That is, a storage container from which an item is to be picked or in which an item is to be stocked must be delivered to a port specifically designated for the purpose of picking/stocking items. Similarly, a storage container exiting the grid for the purpose of being transported to e.g. a neighbouring storage grid or assembly line must be delivered to a port specifically designated for this purpose.

Some of the above-mentioned issues regarding flexibility may be solved by use of extensive conveyor systems, i.e. conveyor belts, rollers etc., as well as dedicated storage container lifts. However, such systems are expensive, service intensive and are vulnerable to single point of failure events that may disrupt the operation of the storage system.

An efficiency issue with prior art automated storage and retrieval systems 1 is that the separate drop-off ports and pick-up ports of the transfer columns 119,120 require the container handling vehicles 200,300 to move to a storage column 105 or a pick-up port after drop-off to retrieve a new storage container 106. Likewise, the container handling vehicles 200,300 have to be empty of a storage container 106 when they are sent to a pick-up port 120 to pick up a storage container. This is often inefficient and causes increased congestion around the ports, as container handling vehicles 200,300 are moving around on the grid without a storage container 106 as payload.

In view of the above, the aim of the present invention is to provide an automated storage and retrieval system, and a method for operating such a system, that solves or at least mitigates one or more of the aforementioned problems related to the use of prior art storage and retrieval systems.

An objective of the present invention is to provide an automated storage and retrieval system which is more effective than prior art systems by avoiding or at least reducing congestion of container handling vehicles at the transfer columns.

Another objective is to provide an automated storage and retrieval system that increases the availability of a transfer column for container handling vehicles operating on top of the storage grid.

Yet another objective is to provide an automated storage and retrieval system which is not vulnerable to single point of failure events that may disrupt the operation of the storage system.

Yet another objective is to provide a flexible automated storage and retrieval system, in which the storage container transfer capacity, as well as the purpose/function of the storage container handling system, can easily be increased or modified after installation.

SUMMARY OF THE INVENTION

The present invention is defined by the appended claims and in the following:

In a first aspect, the present invention provides a storage system comprising a storage grid structure and multiple container handling vehicles, the storage grid structure comprises vertical column profiles defining multiple storage columns, in which storage containers can be stored one on top of another in vertical stacks, and at least one transfer column, the column profiles are interconnected at their upper ends by top rails forming a horizontal top rail grid upon which the container handling vehicles may move in two perpendicular directions, the container handling vehicles are able to retrieve storage containers from, and store storage containers in, the storage columns, and transport the storage containers on the storage grid structure, wherein the storage grid structure comprises at least one horizontal transfer section; and the storage system comprises multiple container transfer vehicles and a transfer floor on which the container transfer vehicles may move horizontally, and the transfer section is arranged at a level below the top rail grid and extends from an external side of the storage grid structure to a position below the at least one transfer column and comprises at least a section of the transfer floor; and each of the container transfer vehicles comprises a container carrier for carrying a storage container and a wheel arrangement for moving the container transfer vehicle in at least two perpendicular directions on the transfer floor; and wherein the at least one transfer column extends from the top rail grid to the transfer section, such that a storage container may be transferred between the top rail grid and the container carrier of one of the container transfer vehicles.

In other words, the at least one transfer column extends from the top rail grid to the transfer section, such that a storage container may be transferred between the top rail grid and the container carrier of one of the container transfer vehicles when the container transfer vehicle is arranged on the transfer floor at a position below the transfer column.

The wheel arrangement features wheels which roll upon the transfer floor, i.e. the wheels of the wheel arrangement are in direct contact with the transfer floor.

The term "transfer floor" is intended to define a planar/flat surface on which the container transfer vehicles may move, for instance a warehouse floor. Depending on the level at which the storage grid structure is arranged, the transfer floor may be arranged at a higher level, such as a raised floor or mezzanine.

The at least one transfer column may also be defined as a column for vertical transfer of a storage container between different levels of the grid structure, preferably by use of a container handling vehicle.

The transfer section may in other words be defined as being arranged at a level below the level of the top rail grid. The transfer section may also be defined as having an upper level, arranged below the level of the top rail grid or below the lower end of the at least one transfer column, and a lower level corresponding to the level of the transfer floor.

In an embodiment of the storage system, the height of the transfer section may be sufficient to allow a container transfer vehicle to travel within the transfer section when carrying a storage container.

In an embodiment, the storage system may comprise a guidance system for guiding the movement of the container transfer vehicles on the transfer floor. The guidance system may communicate with a computerized control system for controlling the operation of the storage system.

In other words, the container transfer vehicles are automated guided container transfer vehicles.

In an embodiment of the storage system, the guidance system may guide the container transfer vehicles between a first position and a second position on the transfer floor, the first position directly below the at least one transfer column and the second position external to the storage grid structure.

In an embodiment of the storage system, the guidance system may comprise at least one sensor on each of the container transfer vehicles for determining the position of the container transfer vehicle on the transfer floor and/or relative to the storage grid structure. The at least one sensor may comprise any of a sensor for detecting magnetism, receiving/transmitting radio signals, receiving/transmitting laser or receiving optic images.

In an embodiment of the storage system, the guidance system may comprise guiding elements for interaction with the container transfer vehicles and/or the at least one sensor, the guiding elements may be arranged on or at any of the transfer floor and the storage grid structure.

In an embodiment of the storage system, the guiding elements may be arranged at or below a lower end of the at least one transfer column, the guiding elements may be arranged to guide the container transfer vehicle to a first position directly below the at least one transfer column.

In an embodiment of the storage system, the guiding elements may comprise reflectors for reflecting a laser from a laser sensor on the container transfer vehicles. In other words, the guidance system may for instance comprise laser reflectors arranged at the lower end of the transfer column to ensure an accurate positioning of the container transfer vehicle at the first position.

In an embodiment of the storage system, the guiding elements may comprise a pair of guide barriers, wherein the pair of guide barriers comprises a first section arranged below the at least one transfer column, in which section the guide barriers are parallel and separated by a distance such that a container transfer vehicle, and/or a storage container arranged on the container carrier of the container transfer vehicle, may be accommodated between the guide barriers of the first section.

In an embodiment of the storage system, the pair of guide barriers may comprise a second section extending from the first section, in which second section the guide barriers are separated by a gradually increasing distance.

In an embodiment of the storage system, the guidance system may comprise a coarse adjustment system and a fine adjustment system, wherein the coarse adjustment system guides the movement of the container transfer vehicle at least between the second position and the transfer section, and the fine adjustment system ensures correct positioning of the container transfer vehicle in the first position below the at least one transfer column.

The coarse adjustment system may comprise at least one sensor on each of the container transfer vehicles for determining the position of the container transfer vehicle on the transfer floor and/or relative to the storage grid structure, and optionally guiding elements for interaction with the at least one sensor.

The at least one sensor may comprise any of a sensor for detecting magnetism, receiving/transmitting radio signals, receiving/transmitting laser or receiving optic images. The guiding elements may comprise any element suitable for interaction with the at least one sensor, such as a laser reflector, magnetic or coloured guide tapes, or a wire for transmitting radio signals.

The fine adjustment system may comprise a laser sensor (e.g. LiDAR) on each of the container transfer vehicles and laser reflectors on or at the lower end of the transfer column, or a pair of guide barriers as disclosed above. The laser emitted by the laser sensor may be modulated or pulsed. When used in the guidance system as a fine adjustment system, the laser is preferably modulated as this provides for greater range and accuracy.

In an embodiment of the storage system, each of the container transfer vehicles may have a horizontal periphery allowing two container transfer vehicles to pass each other when below two adjacent transfer columns.

In an embodiment of the storage system, the wheel arrangement may be suitable for moving the container transfer vehicle in any horizontal direction on the transfer floor. A container transfer vehicle able to move in any horizontal direction upon the transfer floor provides a very flexible storage system.

In an embodiment of the storage system, the wheel arrangement may comprise at least one drive wheel. The at least one drive wheel may be steerable to control the travel direction of the container transfer vehicle.

In an embodiment of the storage system, the wheel arrangement may comprise at least two drive wheels being rotatable in opposite directions to allow the container transfer vehicle to turn around itself.

In an embodiment of the storage system, the container carrier may be rotatably connected to a vehicle body of the container transfer vehicle, such that a storage container arranged on the container carrier may be horizontally rotated by 90 degrees. The rotation of the container carrier may be automatically controlled by the guidance system.

In an embodiment of the storage system, the transfer floor may extend from the position below the at least one transfer column to a second position external to the storage grid structure. In other words, the transfer floor may extend from the position below the at least one transfer column to a second position external to the storage grid structure, such that a container transfer vehicle may move from the position below the at least one transfer column to the second position.

In an embodiment of the storage system, the transfer floor may provide at least one transfer vehicle path extending from a position below the at least one transfer column to a second position external to the storage grid structure, i.e. such that a container transfer vehicle may move from the position below the at least one transfer column to the second position. The transfer floor may provide a plurality of transfer vehicle paths extending from a position below the at least one transfer column to the second position external to the storage grid structure.

In an embodiment of the storage system, the wheel arrangement of each container transfer vehicle may comprise four wheels. The wheel arrangement allows for changing the travel direction of the container transfer vehicle in that at least some of the wheels may be steered, at least some of the wheels may rotate in opposite directions simultaneously or at least some of the wheels may have a different rotational speed.

In an embodiment of the storage system, the at least one transfer column may extend from the top rail grid to the transfer section, such that a container handling vehicle may transfer a storage container between the top rail grid and the container carrier of one of the container transfer vehicles. Each of the container handling vehicles may comprise a lifting device for vertical transfer of a storage container.

In an embodiment of the storage system, the transfer section may extend from a first opening at an external side of the storage grid structure to at least a second opening at an external side of the storage grid structure. In other words, the transfer section may extend through an internal section of the storage grid structure from a first opening at an external side of the storage grid structure to at least a second opening at the same or different external side of the storage grid structure The term "opening" is intended to mean a gap in the storage grid structure through which gap (or opening) at least one container transfer vehicle may pass while carrying a storage container. Preferably, the first and/or second opening has/have a width allowing the passage of at least two container transfer vehicles simultaneously.

In an embodiment of the storage system, the first and second openings may be arranged at separate external sides of the storage grid structure, preferably the first and second openings are arranged at opposite external sides of the storage grid structure.

In an embodiment of the storage system, the transfer floor may provide at least two adjacent transfer vehicle paths, such that at least two of the container transfer vehicles may pass each other in the transfer section, i.e. may pass each other when moving on the transfer floor in the transfer section. In a further embodiment, the transfer floor may provide at least three transfer vehicle paths, such that at least three container transfer vehicles may pass each other in one direction within the transfer section.

In an embodiment, the storage system may comprise multiple transfer columns.

In an embodiment of the storage system, the transfer section may extend below the multiple transfer columns. Preferably, the transfer section may extend below multiple adjacent transfer columns.

In an embodiment of the storage system, the multiple transfer columns may be arranged above one of the transfer vehicle paths.

In a further embodiment, the multiple transfer columns may be arranged above only one of several (e.g. two or three) transfer vehicle paths. In this manner, one (or a single) vehicle path may be dedicated to container transfer vehicles receiving or delivering storage containers from/to the at least one transfer column, while the remaining vehicle paths are dedicated for transfer/movement of container transfer vehicles, optionally carrying a storage container, out of or into the transfer section.

In an embodiment of the storage system, the transfer floor may extend from an external side of the storage grid to a second position external to the storage grid structure.

In an embodiment of the storage system, the transfer floor may extend from the position below the at least one transfer column to a second position external to the storage grid structure. The second position may be at any suitable area, arrangement or station for further processing or transfer of a storage container or its content, or at any suitable position for parking of a container transfer vehicle, e.g. a charging station for the battery driving the container transfer vehicle or a temporary storage position of a storage container arranged on a container transfer vehicle.

In an embodiment of the storage system, the second position may be arranged at a picking/stocking station or area, such that an operator/robot may access the content of a storage container when arranged on a container transfer vehicle.

In an embodiment of the storage system, the second position may be below a transfer column in a transfer section of a second storage grid structure. The second storage grid structure may comprise any of the features of the storage grid structure of the first aspect, and its embodiments, as defined above. Alternatively, the first aspect may be defined as a storage system comprising at least a first storage grid structure. In yet another embodiment, the transfer floor may extend to a third position below a transfer column in a transfer section of a third storage grid structure. In a storage system comprising a first and a second storage grid structure, the second storage grid structure may be arranged at any level and/or position relative the first storage grid structure. When the first and a second storage grid structure are arranged at different levels, the transfer floor may be arranged at different levels interconnected by a container transfer vehicle lift for lifting a container transfer vehicle between the levels.

An advantage of the present invention is the possibility of easily interconnecting multiple separate storage grid structures. This provides an increase in fire safety since the multiple storage grid structures are easily separated in a manner which prevents a fire from spreading from one storage grid structure to another. Further, the use of multiple separate storage grid structures allows for an improved utilization of available space in a storage house or location. Thus, the storage system of the first aspect may also comprise multiple storage grid structures. Each storage grid structure may be interconnected by the transfer floor, such that the container transfer vehicles may move between any of the multiple storage grid structures. The possibility of interconnecting multiple storage grid structures arranged at different levels, e.g. above one another, may also allow optimization of the ratio between available grid/floor space and storage volume.

In an embodiment of the storage system, the second position may be at a production facility, e.g. an assembly line or assembly station.

In an embodiment of the storage system, the transfer floor may comprise at least one transfer vehicle path arranged external to the storage grid structure and interconnecting the first and second openings of the transfer section arranged at separate external sides (or side sections) of the storage grid structure, e.g. such that the transfer section may extend between two opposite sides/walls of the storage grid.

In an embodiment of the storage system, the at least one transfer column may be spaced from the horizontal periphery of the storage grid structure, i.e. the at least one transfer column may be separated from the periphery of the storage grid structure by at least one column, e.g. a storage column.

In an embodiment of the storage system, the transfer section may extend to a section or part of, or a position within, the storage grid structure wherein the horizontal distance to any external side of the storage grid corresponds to the width of at least five adjacent grid columns or wherein the horizontal distance to the external side of the storage grid from which the transfer section extends corresponds to the width of at least five adjacent grid columns.

In an embodiment of the storage system, the length of the transfer section may be equal to at least half the length of an external side of the storage grid structure, which external side extends in the same direction as the transfer section.

In an embodiment of the storage system, the transfer section may comprise, or may be defined by, multiple horizontal ceiling profiles, vertical support profiles arranged at opposite ends of at least some of the ceiling profiles. The ceiling and support profiles may also be termed ceiling and support beams.

In an embodiment of the storage system, the height of the transfer section may be defined by the distance between a lowermost surface of a ceiling profile and the surface of the transfer floor. Consequently, a container transfer vehicle carrying a storage container may have a height being lower than the height of the transfer section when arranged on the transfer floor.

In an embodiment of the storage system, the multiple transfer columns may be defined by, or comprises, vertical column profiles extending from the top rail grid to the ceiling profiles.

In an embodiment, the storage system may comprise an operator access passage arranged adjacent to at least one side of the transfer section. The access passage may run adjacent to the transfer section, such that an operator or service person may access a container transfer vehicle arranged on the transfer floor within the transfer section.

In an embodiment, the transfer of the storage container between the top rail grid and the container carrier of one of the container transfer vehicles may be performed by a dedicated container lift arranged in the transfer column. However, the transfer of the storage container between the top rail grid and the container carrier of one of the container transfer vehicles may preferably be performed by any of the container handling vehicles, i.e. by use of a lifting device of any of the container handling vehicles.

The at least one transfer column may preferably be arranged such that a container handling vehicle may lower a storage container from the top rail grid, via the transfer column, to a container transfer vehicle arranged below the transfer column. Consequently, the lower end of the transfer column may have an opening allowing the storage container to enter the transfer section from above. In other words, the lower end of the transfer column may have a transfer port allowing the storage container to enter the transfer section from above.

In an embodiment of the storage system, the transfer section comprises multiple horizontal ceiling profiles supported by vertical support profiles, and the vertical column profiles of the at least one transfer column extend from the top rail grid to the ceiling profiles. The vertical column profiles of the transfer column may be supported by the ceiling profiles. In other words, the lower ends of the vertical column profiles of the transfer column may be supported by, or on, the ceiling profiles.

In an embodiment of the storage system, the at least one transfer column provides a transfer port or opening arranged at an upper level of the transfer section, the transfer port or opening arranged to allow vertical transfer of a storage container between the transfer column and a container transfer vehicle, and the upper level arranged at a height sufficient to allow a container transfer vehicle to travel within the transfer section when carrying a storage container.

In an embodiment of the storage system, the transfer section may extend to an internal section of the storage grid structure, wherein the horizontal distance to an external side, side wall or section of the storage grid corresponds to the width of at least five, at least six or at least seven adjacent grid columns. In other words, the transfer section may extend to a position below a transfer column being separated from any external side section of the storage grid structure. The transfer column may for example be separated from any external side section of the storage grid structure by at least five, at least six or at least seven adjacently arranged storage columns, or may be arranged proximate to a centre of the storage grid structure. Having a transfer section extending a sufficient length within the storage grid structure ensures that the distances between the storage columns and the transfer columns are minimized. As a consequence, the container handling vehicles will spend less time travelling back and forth to the transfer columns and the operation of the system is optimized.

The container carrier may be arranged to receive a container from above and hence carry that container above the container transfer vehicle, e.g. carry the container at a level above a vehicle body of the container transfer vehicle. The storage system may be arranged such that in use containers are passed directly between container handling vehicles and container transfer vehicles.

In an embodiment of the storage system, each of the vertical column profiles comprises four corner sections, wherein each corner section is arranged to accommodate a corner of a storage bin.

In a second aspect, the present invention provides a method of retrieving a storage container from a storage system comprising a storage grid structure and multiple container handling vehicles, the storage grid structure comprises vertical column profiles defining multiple storage columns, in which storage containers can be stored one on top of another in vertical stacks, and at least one transfer column, the column profiles are interconnected at their upper ends by top rails forming a horizontal top rail grid upon which the container handling vehicles may move in two perpendicular directions, the container handling vehicles are able to retrieve storage containers from, and store storage containers in, the storage columns, and transport the storage containers on the storage grid structure, wherein the storage grid structure comprises at least one horizontal transfer section; and the storage system comprises multiple container transfer vehicles and a transfer floor on which the container transfer vehicles may move horizontally, and the transfer section is arranged at a level below the top rail grid and extends from an external side of the storage grid structure to a position below the at least one transfer column and comprises at least a section of the transfer floor; and each of the container transfer vehicles comprises a container carrier for carrying a storage container and a wheel arrangement for moving the container transfer vehicle on the transfer floor; and wherein the at least one transfer column extends from the top rail grid to the transfer section; wherein the method comprises the steps of:

retrieving a storage container from one of the storage columns using one of the container handling vehicles;

moving the container handling vehicle and the storage container to a transfer column;

lowering the storage container to a container transfer vehicle arranged in the transfer section at a position below the transfer column; and moving the container transfer vehicle and the storage container to a position external to the storage grid structure.

In an embodiment of the method of retrieving a storage container from a storage system, the storage system may comprise any of the features of the embodiments of the first aspect.

In an embodiment of the method of retrieving a storage container from a storage system, the position external to the storage grid may be selected from a position at a picking/stocking station or area, such that an operator or robot may access the content of a storage container while the container is arranged on the container transfer vehicle, a position below a transfer column in a transfer section of a second storage grid structure, and a position at a production facility, e.g. an assembly line or assembly station.

In a third aspect, the present invention provides a method of retrieving and storing an item in a storage system comprising a storage grid structure and multiple container handling vehicles, the storage grid structure comprises vertical column profiles defining multiple storage columns, in which storage containers can be stored one on top of another in vertical stacks, and at least one transfer column, the column profiles are interconnected at their upper ends by top rails forming a horizontal top rail grid upon which the container handling vehicles may move in two perpendicular directions, the container handling vehicles are able to retrieve storage containers from, and store storage containers in, the storage columns, and transport the storage containers on the storage grid structure, wherein the storage grid structure comprises at least one horizontal transfer section; and the storage system comprises multiple container transfer vehicles and a transfer floor on which the container transfer vehicles may move horizontally, and the transfer section is arranged at a level below the top rail grid and extends from an external side of the storage grid structure to a position below the at least one transfer column and comprises at least a section of the transfer floor; and each of the container transfer vehicles comprises a container carrier for carrying a storage container and a wheel arrangement for moving the container transfer vehicle in at least two perpendicular directions upon the transfer floor; and wherein the at least one transfer column extends from the top rail grid to the transfer section; wherein the method comprises the steps of:

stocking a storage container with the item;

arranging the storage container on a container transfer vehicle, the container transfer vehicle being a mobile storage for the item;

moving the container transfer vehicle to a picking/stocking station when the item is to be picked.

In an embodiment of the method of retrieving and storing at least one item, the storage system may comprise any of the features of the embodiments of the first aspect.

In an embodiment of the method of retrieving and storing at least one item, the transfer floor may comprise a storage zone for parking of container transfer vehicles comprising a storage container with high turnover items. The method of the third aspect may then comprise the step of parking the container transfer vehicle at the storage zone and/or the step of moving the container transfer vehicle from the storage zone to a picking/stocking station when the item is to be picked.

The at least one item may also be termed a high turnover item, i.e. an item that is frequently retrieved from the storage system.

In a fourth aspect, the present invention provides a method of transferring a storage container in a storage system comprising a first storage grid structure, a second storage grid structure and multiple container handling vehicles, each storage grid structure comprises vertical column profiles defining multiple storage columns, in which storage containers can be stored one on top of another in vertical stacks, and at least one transfer column, the column profiles are interconnected at their upper ends by top rails forming a horizontal top rail grid upon which the container handling vehicles may move in two perpendicular directions, the container handling vehicles are able to retrieve storage containers from, and store storage containers in, the storage columns, and transport the storage containers on the storage grid structure, wherein each storage grid structure comprises at least one horizontal transfer section; and the storage system comprises multiple container transfer vehicles and a transfer floor on which the container transfer vehicles may move horizontally, and each transfer section is arranged at a level below the top rail grid and extends from an external side of the respective storage grid structure to a position below the at least one transfer column and comprises at least a section of the transfer floor; and each of the container transfer vehicles comprises a container carrier for carrying a storage container and a wheel arrangement for moving the container transfer vehicle in at least two perpendicular directions upon the transfer floor; and wherein the at least one transfer column extends from the top rail grid to the transfer section; wherein the method comprises the steps of:

retrieving a storage container from one of the storage columns in the first storage grid structure using a first container handling vehicle;

moving the first container handling vehicle and the storage container to a first transfer column in the first storage grid structure;

lowering the storage container to a container transfer vehicle arranged in the transfer section of the first storage grid structure at a position below the first transfer column, preferably by using a lifting device of the first container handling vehicle;

moving the container transfer vehicle and the storage container on the transfer floor to the transfer section of the second storage grid structure;

arranging the container transfer vehicle at a position below a second transfer column in the second storage grid structure; and transferring the storage container to a second container handling vehicle via the second transfer column, preferably by using a lifting device of the second container handling vehicle.

In an embodiment, the method of transferring a storage container in a storage system may comprise the step of moving the second container handling vehicle and the storage container to one of the storage columns in the second storage grid structure. The step may further comprise lowering the storage container into one of the storage columns in the second storage grid structure, for instance by using the lifting device of the second container handling vehicle.

In an embodiment of the method of transferring a storage container in a storage system, the storage system may comprise any of the features of the embodiments of the first aspect.

In a fifth aspect, the present invention provides a method of retrieving a storage container from a storage system comprising a storage grid structure and multiple container handling vehicles, the storage grid structure comprises vertical column profiles defining multiple storage columns, in which storage containers can be stored one on top of another in vertical stacks, and at least one transfer column, the column profiles are interconnected at their upper ends by top rails forming a horizontal top rail grid upon which the container handling vehicles may move in two perpendicular directions, the container handling vehicles are able to retrieve storage containers from, and store storage containers in, the storage columns, and transport the storage containers on the storage grid structure, wherein the storage grid structure comprises at least one horizontal transfer section; and the storage system comprises multiple container transfer vehicles and a transfer floor on which the container transfer vehicles may move horizontally, and the transfer section is arranged at a level below the top rail grid and extends from an external side of the storage grid structure to a position below the at least one transfer column and comprises at least a section of the transfer floor; and each of the container transfer vehicles comprises a container carrier for carrying a storage container and a wheel arrangement for moving the container transfer vehicle in at least two perpendicular directions upon the transfer floor; and wherein the at least one transfer column extends from the top rail grid to the transfer section; wherein the method comprises the steps of:

retrieving a first storage container from one of the storage columns using one of the container handling vehicles;

moving the container handling vehicle and the first storage container to a transfer column;

lowering the first storage container to a first container transfer vehicle arranged in the transfer section at a position below the transfer column by using a lifting device of the container handling vehicle;

raising the lifting device sufficiently to separate the lifting device from the first storage container;

moving the first container transfer vehicle and the first storage container away from the position below the transfer column;

moving a second container transfer vehicle carrying a second storage container to the position below the transfer column; and retrieving the second storage container via the transfer column by using the lifting device.

In an embodiment of the fifth aspect, the method may comprise a step of moving the container handling vehicle and the second storage container to one of the storage columns in the storage grid structure. The step may further comprise lowering the second storage container into one of the storage columns in the storage grid structure, for instance by using the lifting device of the container handling vehicle. Thus, the container handling vehicle may receive the second storage container from the second container transfer vehicle immediately after lowering the first storage container to the first container transfer vehicle and before fully retracting its lifting device.

In an embodiment of the fifth aspect, the storage system may comprise any of the features of the embodiments of the first aspect.

In a sixth aspect of the invention, there is provided a storage network comprising a plurality of storage systems according to the first aspect of the invention, wherein the transfer floors of the respective storage systems are connected to provide access for container transfer vehicles of each storage system to each of the storage grid structures and enable the transfer of storage containers between storage grid structures of the respective storage systems. The storage network may allow the volume of each grid structure to be kept to an optimum size, preserving the ratio of its external surface to its volume and hence preserving access efficiency to the stored containers. In other words, the overall storage volume can be increased while maintaining an optimum working effective external surface area to volume ratio.

The term "transfer section" is in the present application intended to mean a substantially horizontal tunnel/passageway and/or recess in the storage grid structure, having at least one open end or side, i.e. opening, at an external side or wall of the storage grid. The opening allows a container transfer vehicle to enter/exit the transfer section from a position external to the storage grid structure. Alternatively, the term "transfer section" may be replaced by "transfer section space" or "transfer space".

SHORT DESCRIPTION OF THE DRAWINGS

The present invention is described in detail below by way of example only and with reference to the following drawings:

FIGS. 1 and 2 are perspective views of a prior art automated storage and retrieval system, wherein FIG. 1A and FIG. 2A show the complete system and FIG. 1B and FIG. 2B show examples of prior art container handling vehicles suitable for use in the system.

DETAILED DESCRIPTION OF THE INVENTION

Figure 1:
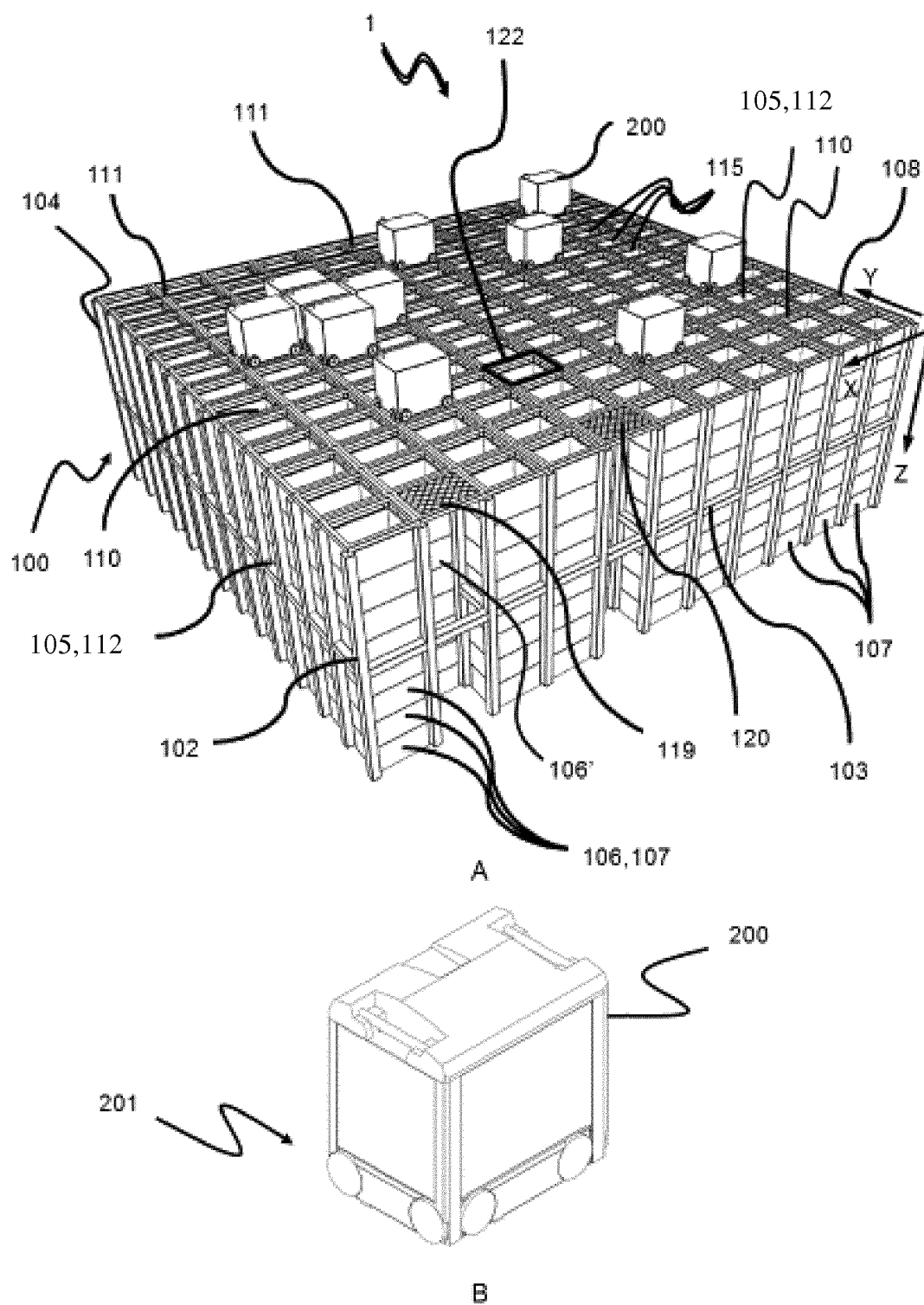

In the following, embodiments of the invention will be discussed in more detail with reference to the appended drawings. It should be understood, however, that the drawings are not intended to limit the invention to the subject-matter depicted in the drawings. Furthermore, even if some of the features are described in relation to the system only, it is apparent that they are valid for the related methods as well, and vice versa.

Figure 2:
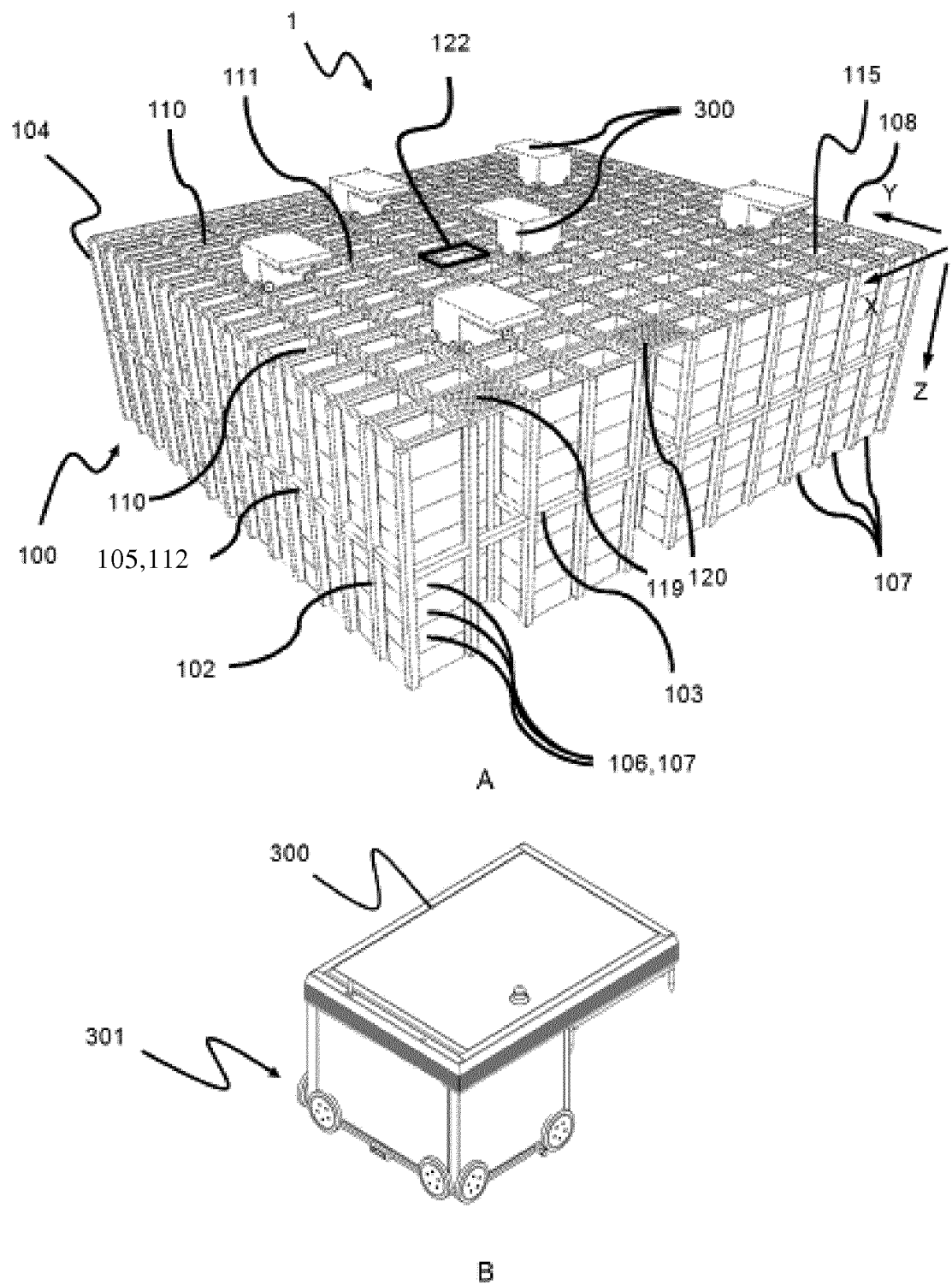
Figure 3:
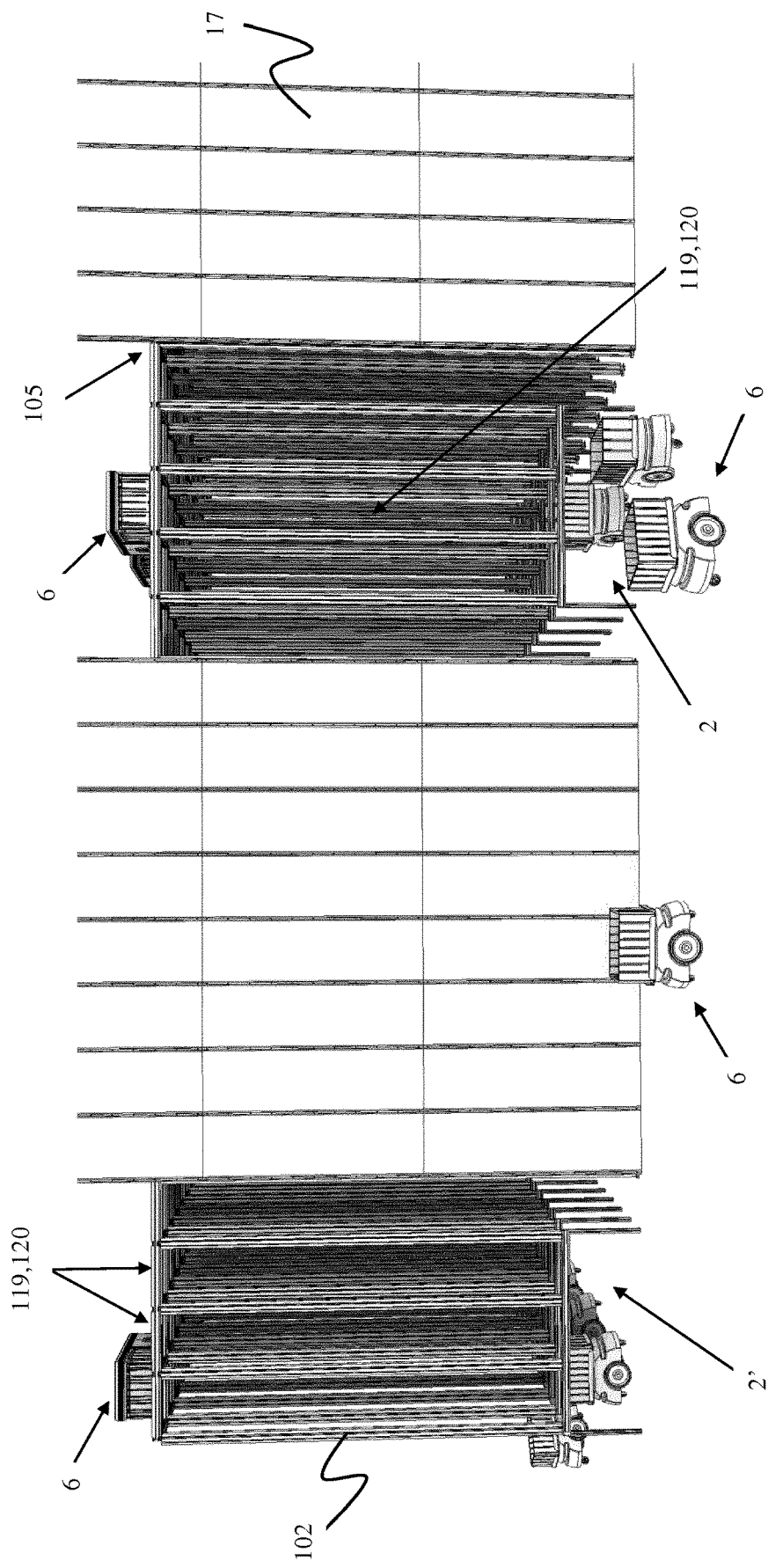
FIG. 3 is a perspective side view of a first exemplary storage system according to the invention.
Figure 4:
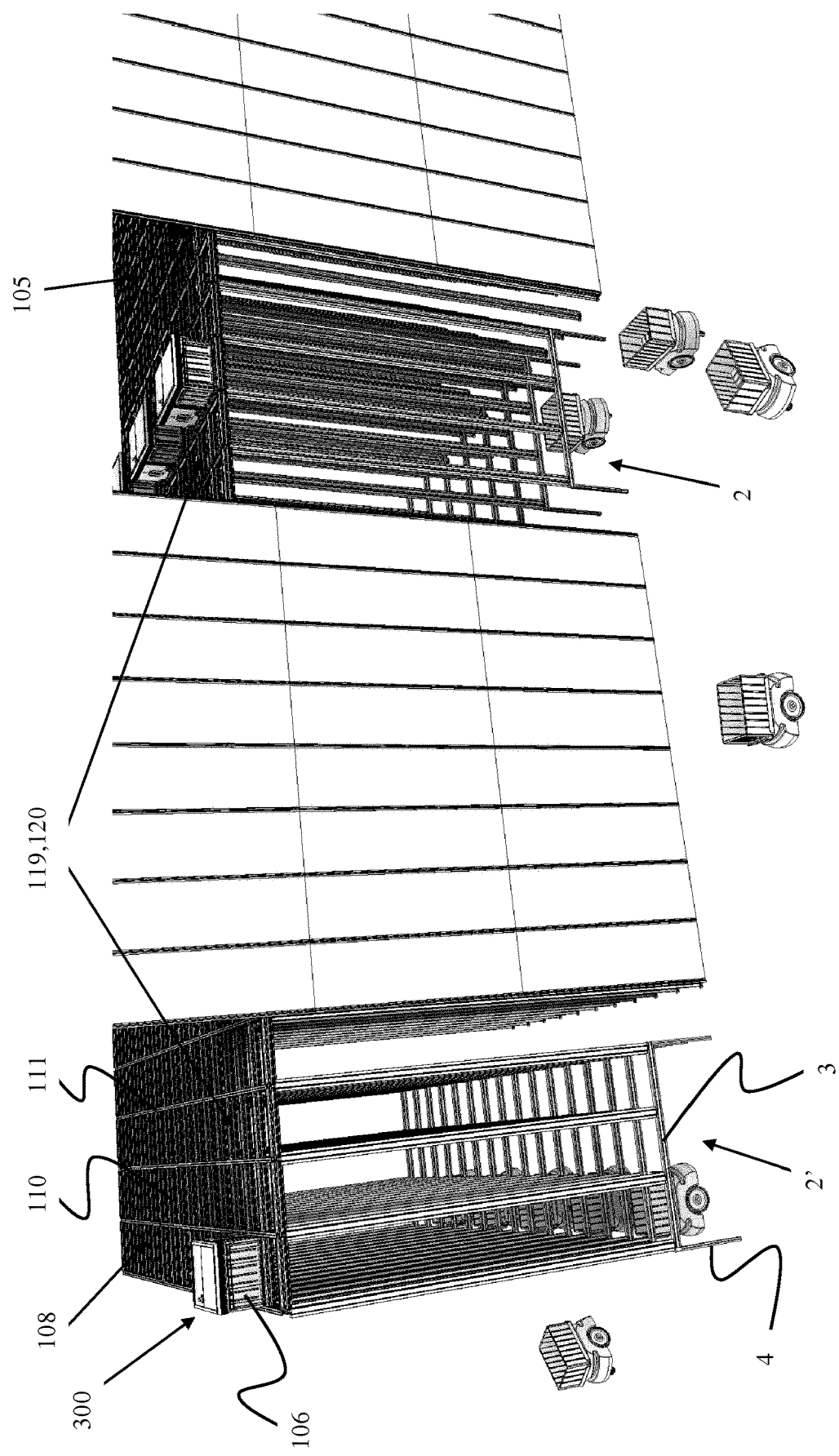
FIG. 4 is a perspective view of the storage system in FIG. 3.

A first exemplary embodiment of a storage system according to the invention is shown in FIGS. 3 and 4. The storage system features a storage grid structure, multiple container handling vehicles 300 and container transfer vehicles 6. The major part of the storage grid structure is constructed in the same manner as in the prior art systems shown in FIGS. 1A and 2A. That is, the storage grid structure 104 comprises vertical column profiles 102 defining multiple storage columns 105, in which storage containers 106 can be stored one on top of another in vertical stacks 107. In FIGS. 3 and 4, the storage columns 105 and the stacks of storage containers are arranged behind grid screens 17. The column profiles 102 are interconnected at their top ends by top rails 110,111 forming a horizontal rail grid 108 (hereinafter termed the top rail grid) upon which container handling vehicles 300 may move in two perpendicular directions. To guide the vertical movement of the storage containers within a storage column, each of the vertical column profiles 102 has a cross-section featuring four corner sections 21, wherein each corner section is arranged to accommodate a corner of a storage bin 106.

In addition to the storage columns 105, the storage grid structure of the inventive storage system comprises multiple transfer columns 119,120 through which storage containers may be transferred between the top rail grid 108 (i.e. the top level of the grid), a first transfer section 2 and a second transfer section 2'. The transfer sections extend into the storage grid structure at a level below the top rail grid. The first transfer section 2 extends from an opening in an external side of the grid structure 104, while the second transfer section 2' extends along or adjacent an external side section 12 of the storage grid 104. and below the multiple transfer columns 119,120. In an advantageous embodiment, especially in connection with large storage grids, the first transfer section 2 may extend to a substantially central position of the storage grid, and even pass all the way through the storage grid via a substantially central section of the storage grid structure 104. The first transfer section 2 will then provide transfer columns 119,120 at an internal section of the storage grid structure and also reduce the distance a storage handling vehicle 200,300 must travel to reach a transfer column.

Each transfer section 2,2' is defined or constructed by multiple horizontal ceiling profiles 3, vertical support profiles 4 and a section of a transfer floor 5. The height H of the transfer section 2 may be defined by the distance between a lowermost surface of a ceiling profile 3 and the surface of the transfer floor 5. The multiple transfer columns 119,120 are defined by vertical column profiles extending from the top rail grid to the ceiling profiles 3. The lower ends of the vertical column profiles of the multiple transfer columns are supported by the ceiling profiles. Each transfer column provides a transfer port 20 arranged at the upper level of the transfer section. The height H of the transfer section 2 is sufficient to allow a container transfer vehicle 6 to travel within the transfer section 2 when carrying a storage container 106. The cross-section of the vertical column profiles 102 is arranged such that a transfer column 119,120 may guide a storage container 106 in a vertical direction and prevents the storage container from exiting the transfer column in a transverse direction. Thus, to transfer a storage container between a transfer column and a container transfer vehicle 6, the lower end of the transfer column must be arranged at a level at or above the height of the transfer section 2. In other words, the lower end of the transfer column must be arranged at a level sufficient to allow a container transfer vehicle 6 to be positioned below the transfer column when carrying a storage container.

Figure 12:
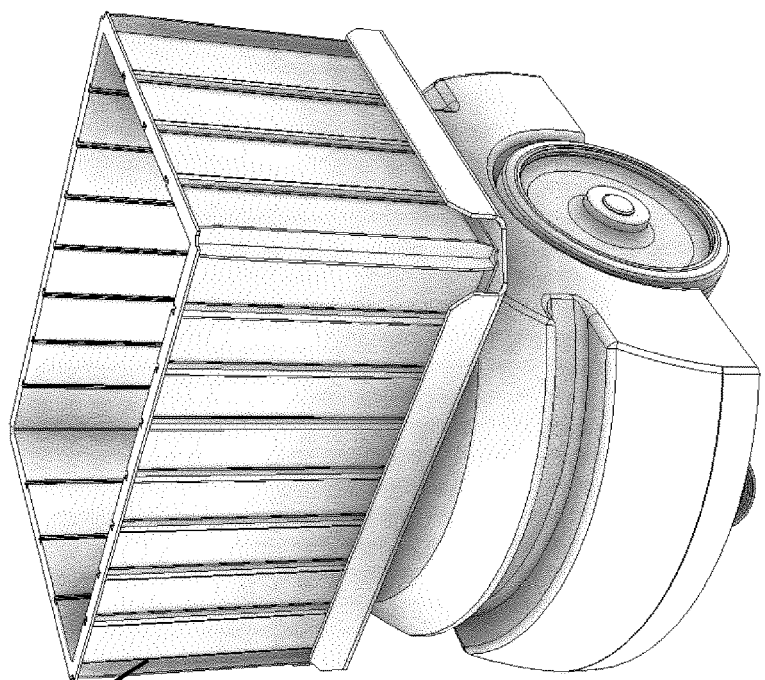
FIGS. 11 and 12 are perspective views of a container transfer vehicle for use in a storage system as shown in FIGS. 4-10.
Figure 11:
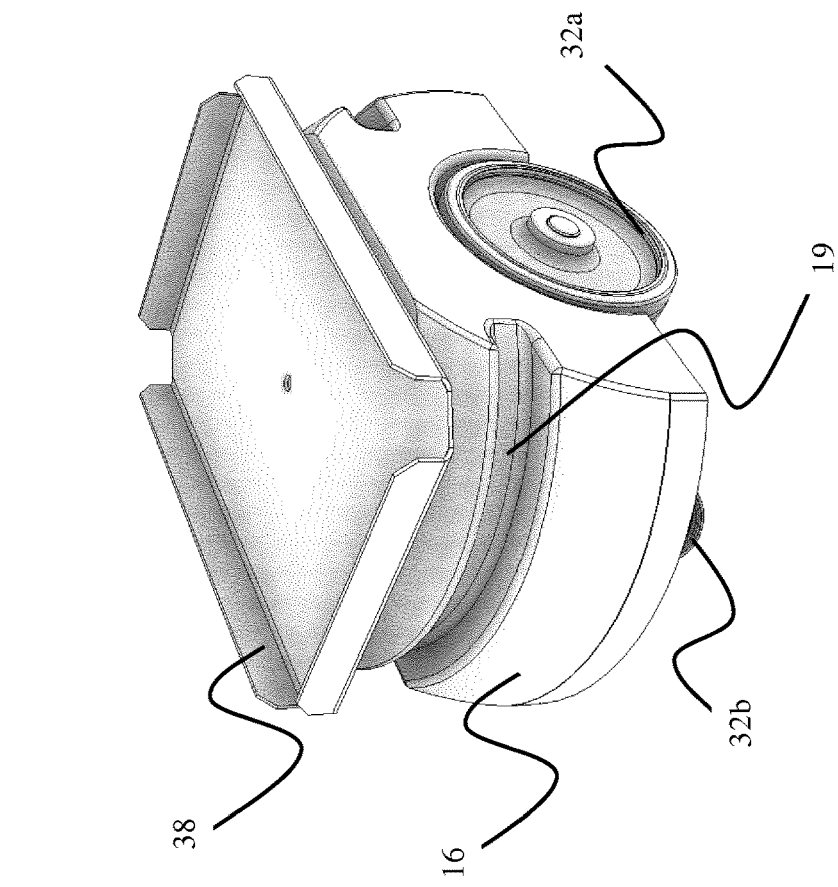

An exemplary container transfer vehicle 6 is shown in FIGS. 11 and 12. The container transfer vehicle 6 features a vehicle body 16, a sensor which in this specific embodiment is a laser sensor 19, a wheel arrangement 32a, 32b allowing the vehicle to roll upon the transfer floor 5 and a container carrier 38 for accommodating a storage container 106 to be transferred. The disclosed container transfer vehicle 6 features two drive wheels 32a arranged on opposite sides of the vehicle body 16. The two drive wheels 32a may be rotated in opposite directions to allow the vehicle to turn around itself. Various container transfer vehicles suitable for the present inventive storage system are known and disclosed in for example WO 2018/189106 A1, WO 2018/163753 A1 and https://industrial.omron.co.uk/en/products/mobile-robot#technology.

The differences in layout of the first transfer section 2 and the second transfer section 2', the rectangular cross-section of the storage containers/transfer columns, as well as the specific wheel arrangement of the disclosed container transfer vehicles, entail that the horizontal direction of a storage container must be turned 90 degrees before it may be transferred through a transfer column of the first transfer section 2, i.e. turned 90 degrees relative the initial direction of the storage container when it enters the first transfer section 2. To turn/rotate the storage container as required, the container carrier 38 of each of the container transfer vehicles 6 are rotatably connected to the vehicle body 16, such that the container carrier may be automatically rotated relative to the vehicle body when required, see FIGS. 11 and 12. In further embodiments of the storage system, a storage container 106 may be rotated by turning the vehicle body 16. Alternatively, to avoid the issue of having to turn the storage containers, all transfer sections of the storage system may have a similar layout.

The storage system features a guidance system for guiding the movement of the container transfer vehicles 6 on the transfer floor 5 between a first position directly below one of the transfer columns 119,120 and a second position external to the grid structure 104. The guidance system comprises the laser sensor 19 arranged on the container transfer vehicles 6 for determining the position of the container transfer vehicle on the transfer floor 5 and/or relative to the grid structure 104. Other sensors suitable for this use are well known and include any sensor commonly used in guiding automated guided vehicles (AGV's). Such sensors include sensors for detecting magnetism, receiving/transmitting radio signals, detecting/transmitting laser, receiving optic images etc. The guidance system may also comprise any suitable guiding element arranged on/in the transfer floor and/or the grid structure for cooperation with the sensor(s) of the container transfer vehicle. Such guiding elements may for instance include laser reflectors arranged on the grid structure, magnetic wire or optic tapes arranged on/in the transfer floor, etc.

The storage system in FIGS. 3-4 has a guidance system featuring a laser sensor 19 (i.e. a sensor able to transmit and receive/detect a laser array, lidar or similar) arranged on the container transfer vehicles 6 and laser reflectors (not shown) arranged on the grid structure 104. In particular, the guidance system may comprise laser reflectors arranged at the lower end of the transfer columns 119,120, for instance at each of four column profiles 102 constituting a transfer column, to ensure that the container transfer vehicle 6 is able to be arranged at the exact position required to receive/deliver a storage container from/to the transfer column, i.e. at the first position.

The disclosed container carrier 38 is in the form of a tray upon which a storage container 106 may be accommodated. However, numerous alternative solutions for suitable container carriers 38 are envisaged and the main functional feature of all suitable containers carriers is the ability to receive a storage container 106 being lowered on top of the container carrier and retain the storage container during movement of the container transfer vehicle upon the transfer floor 5. The horizontal periphery of the container transfer vehicle 6 is preferably such that each of the multiple adjacent transfer columns 119,120 may be used to transfer a storage container 106 to a respective container transfer vehicle 6 simultaneously. To obtain the latter function, the horizontal periphery of the container transfer vehicle 6 fits within the horizontal area defined by one of the grid cells 122 of the top rail grid 108.

Figure 13:
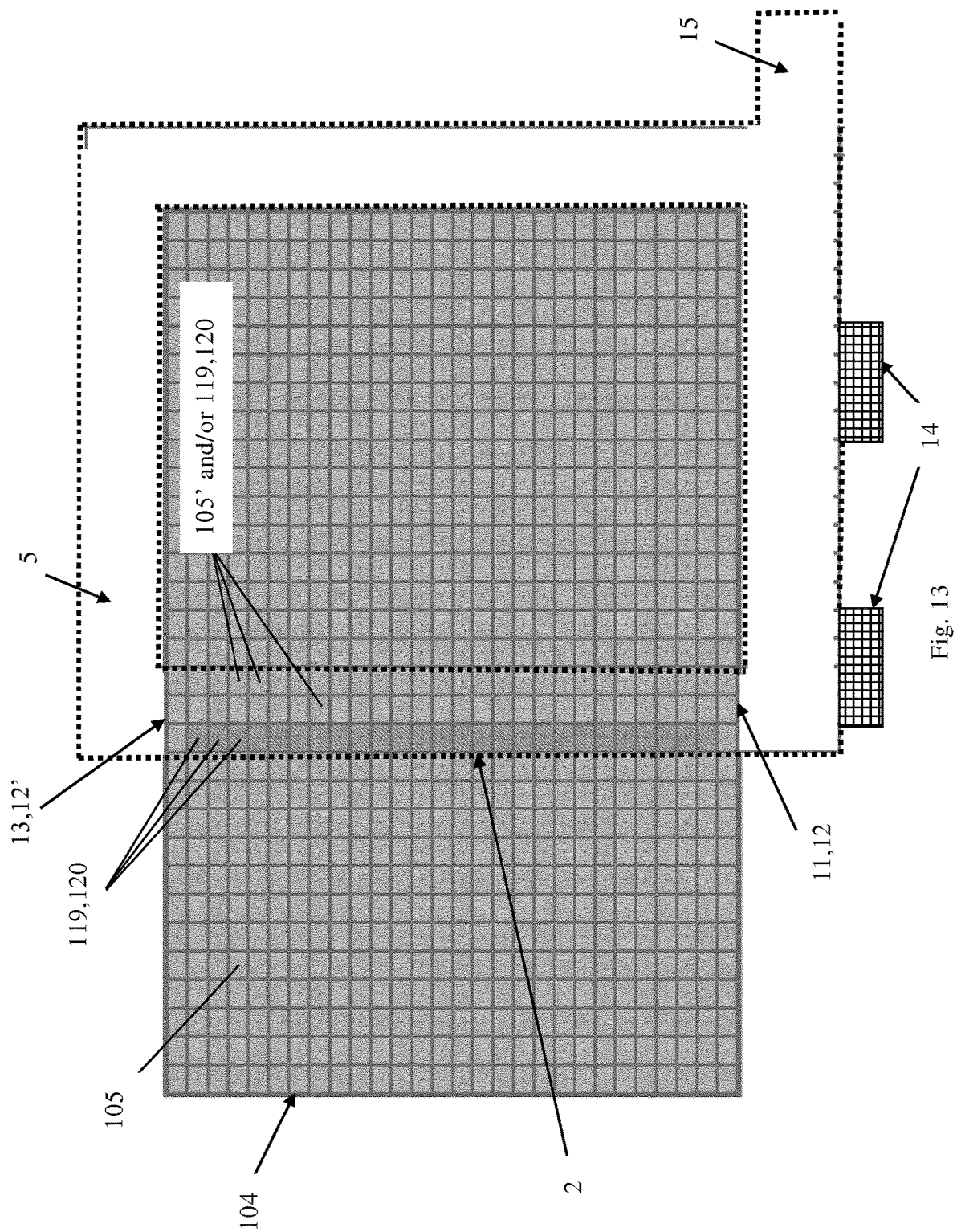
FIG. 13 is a schematic drawing of an exemplary layout of a storage system according to the invention.

The grid columns arranged above the transfer section and not designated as transfer columns 119,120 may alternatively be used as storage columns 105', see FIG. 13. This is achieved by adding stopper elements (e.g. brackets fastened to the relevant column profiles, not shown) at the lower end of the respective grid columns. The stopper elements are designed to support a storage container 106 being lowered into the respective grid column and prevent it from entering the transfer section 2 below. In this manner a minimum of potential storage space is lost from the storage grid structure 104 due to the transfer section 2. The stopper elements may also be used to provide an operator passage below a row of storage columns 105' adjacent to the transfer section 2. In this manner, an operator or service person may access a container transfer vehicle 6, for instance in case of a failure preventing the vehicle from exiting the transfer section.

The transfer floor 5 extends out of the storage grid structure 104 and the container transfer vehicles 6 may be used to transfer storage containers 106 between multiple separate storage grid structures, transfer containers from a storage grid to a picking/stocking station, transfer storage containers to dedicated stocking zones, transfer storage containers to an assembly line for delivery of parts, etc.

Figure 5:
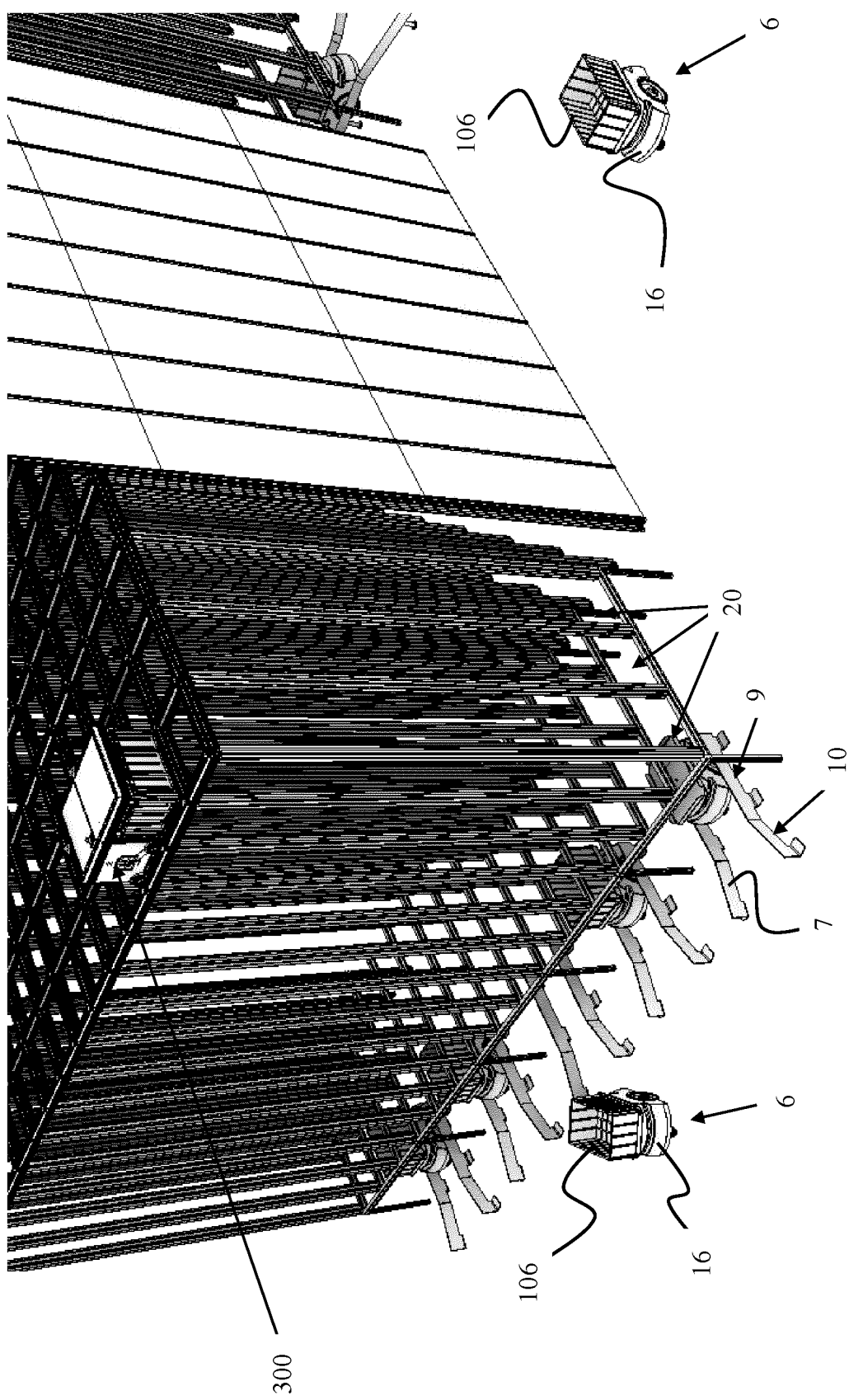
FIG. 5 is a perspective view of a second exemplary storage system according to the invention.
Figure 6:
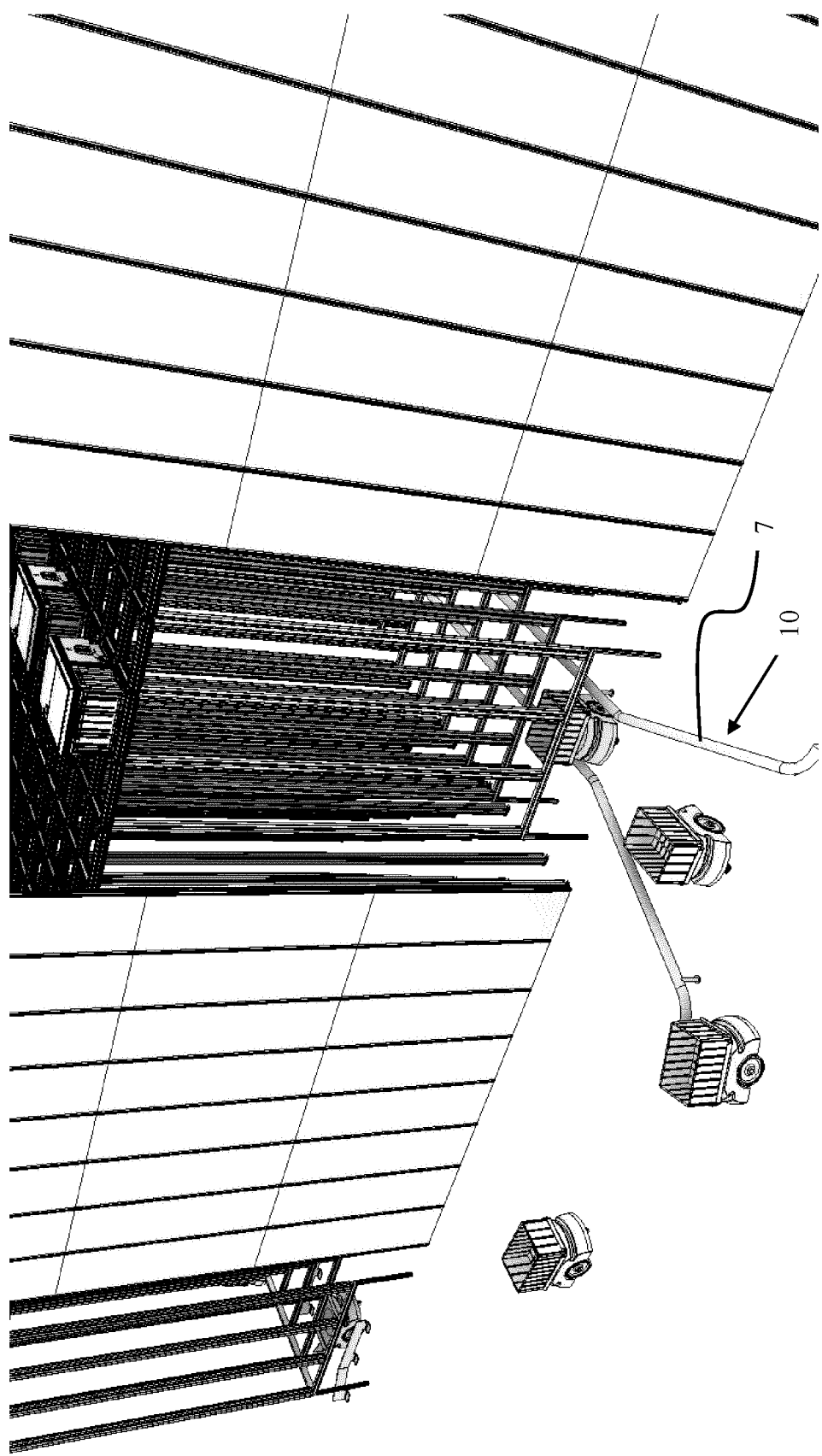
FIG. 6 is a perspective view of the storage system in FIG. 5.
Figure 7:
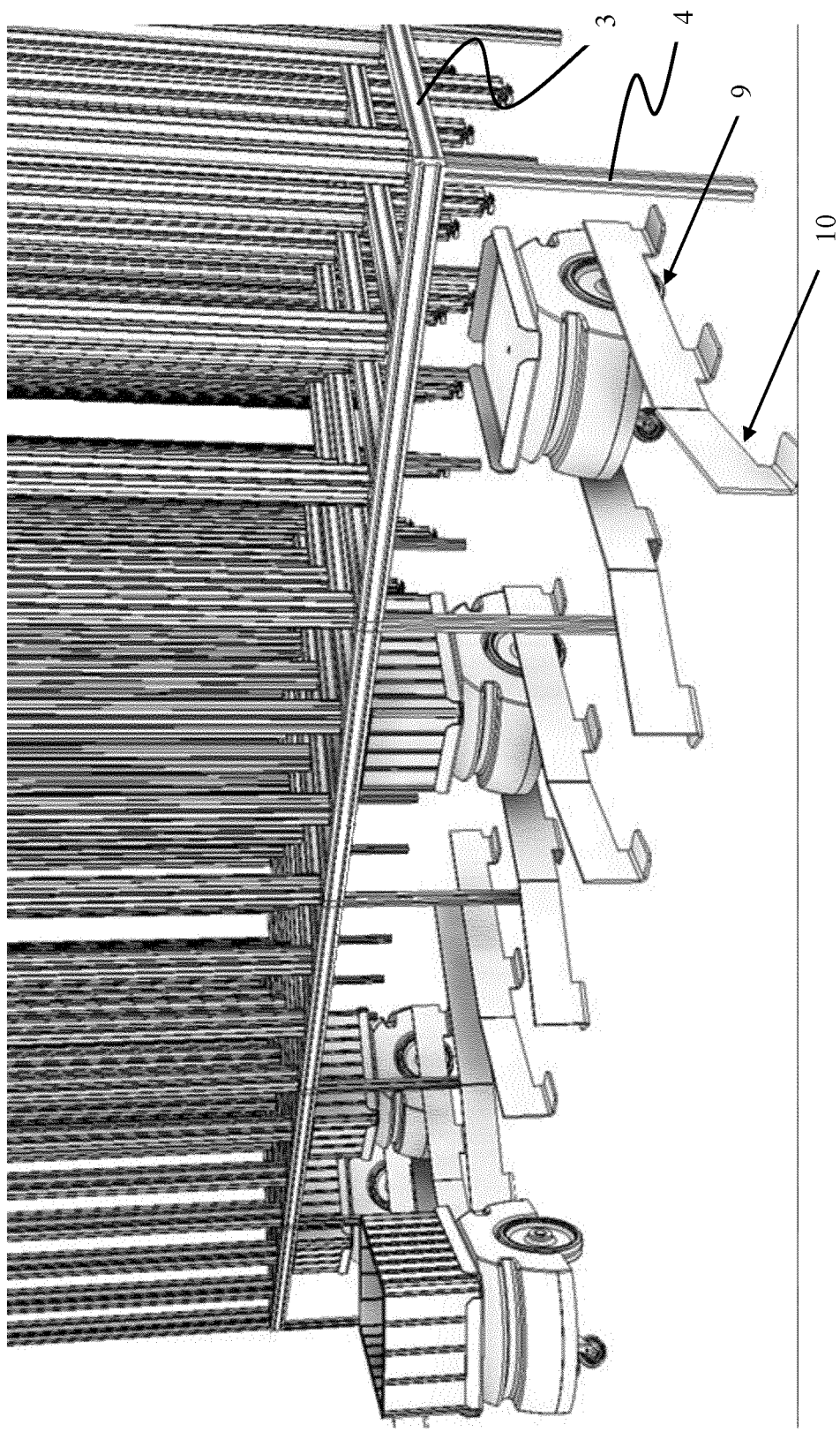
FIG. 7 is a perspective view showing details of a transfer section of the storage system in FIGS. 5 and 6.

A second exemplary embodiment of a storage system according to the invention is shown in FIGS. 5-7. In this embodiment, the differentiating feature in view of the embodiment discussed above is that the transfer sections 2,2' feature guide barriers 7 (i.e. guiding elements) arranged on the transfer floor 5 to guide the transfer vehicles to a position directly below one of the transfer columns 119,120. The guide barriers 7 ensure that the container transfer vehicle is correctly positioned in a sideways direction, i.e. the direction perpendicular to the direction in which the vehicle moves towards the first position below the transfer column.

The guide barriers comprise a first section 9 of two parallel barriers arranged below one of the transfer columns. In the first section the barriers are separated by a distance substantially corresponding to the width of a container transfer vehicle. A second section 10 of guide barriers extends from the first section to facilitate the movement of the container handling vehicle to the first section of guide barriers. The second section features two guide barriers having a gradually increasing distance between them. In the embodiment of FIGS. 5-7, the guide barriers are beams or rails, but they may alternatively be constructed of any suitable element providing the required guiding function.

The first section of guide barriers may optionally feature stopping elements (not shown) arranged to stop the container transfer vehicle when in the correct position below a transfer column.

The final positioning of the container transfer vehicle below a transfer column must be very precise, i.e. within a margin of only a few millimetres. To obtain the required precision, the sensors on the container handling vehicles must either be very accurate, as the laser sensor 19 in the first exemplary embodiment in FIGS. 3 and 4, and/or the container handling vehicles may be physically guided by guide barriers 7. Container transfer vehicles having sensors with high accuracy, e.g. laser arrays, lidar etc. are commonly more expensive than corresponding vehicles having sensors of lower accuracy, e.g. sensors for detecting magnetic strips in the floor etc.

The preferred type of sensor on the container transfer vehicle and the preferred type of guiding element will depend on the layout of the specific storage system, the required transfer column capacity etc.

Figure 8:
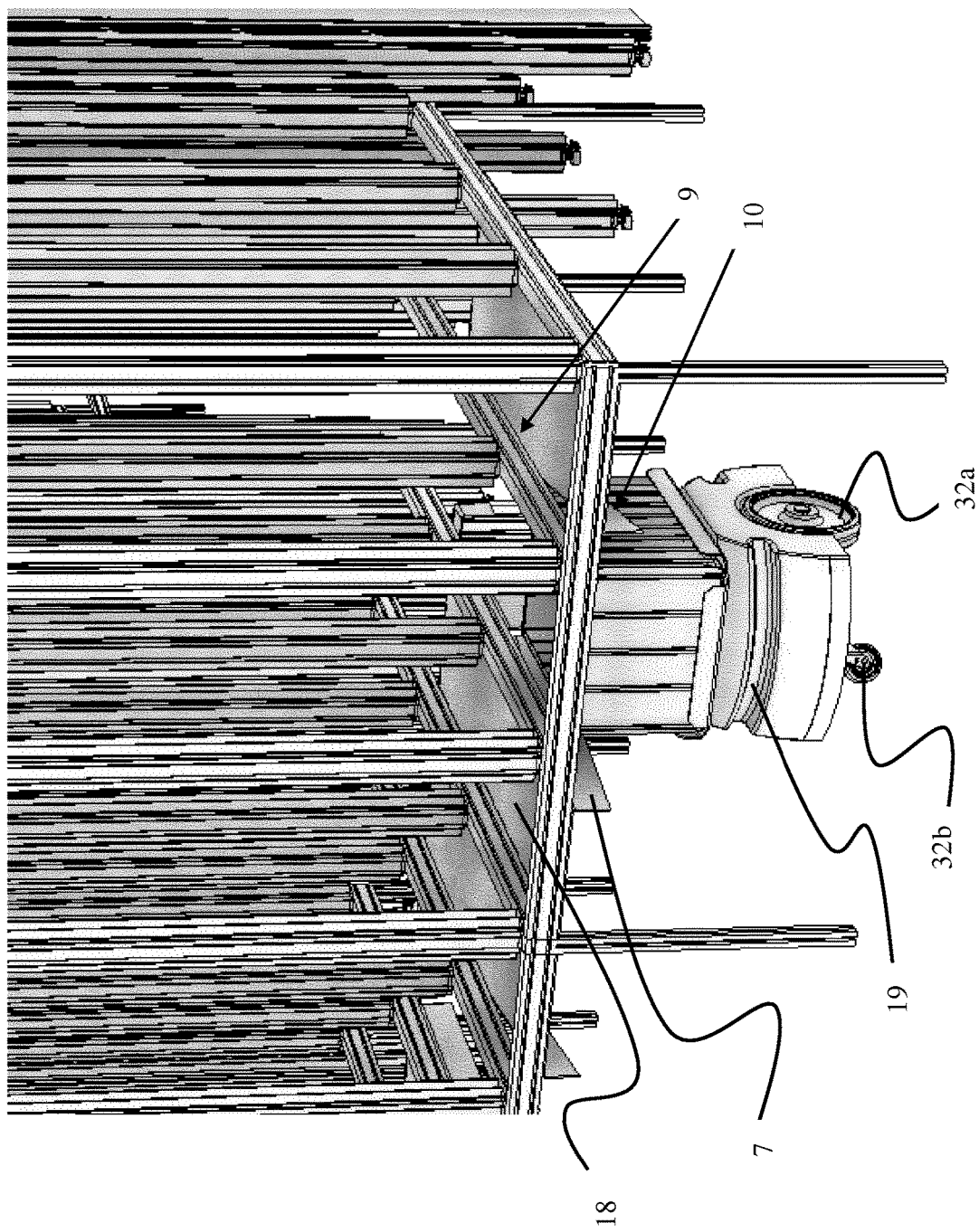
FIGS. 8-10 are detailed views of a third exemplary storage system according to the invention.
Figure 9:
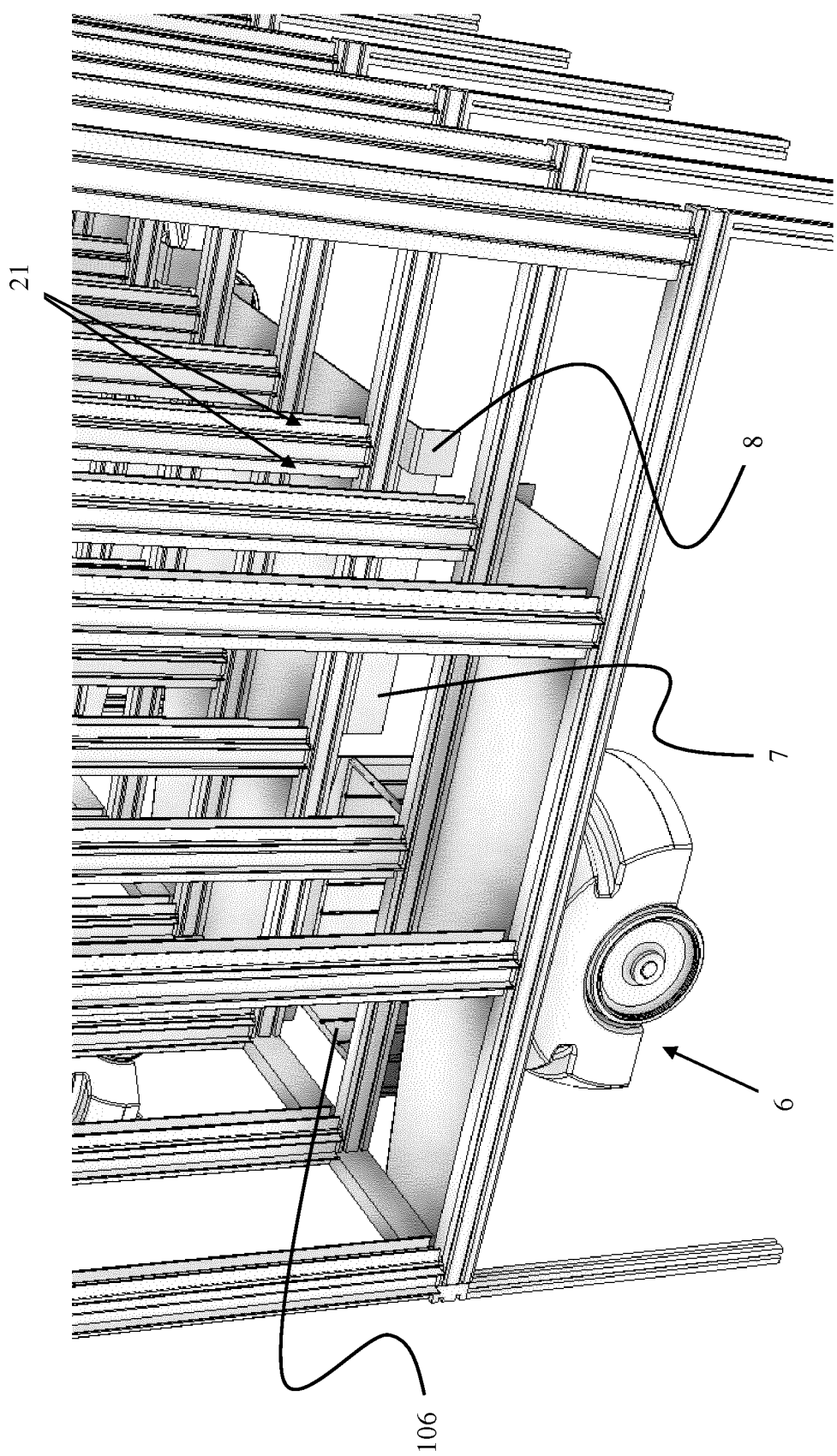
Figure 10:
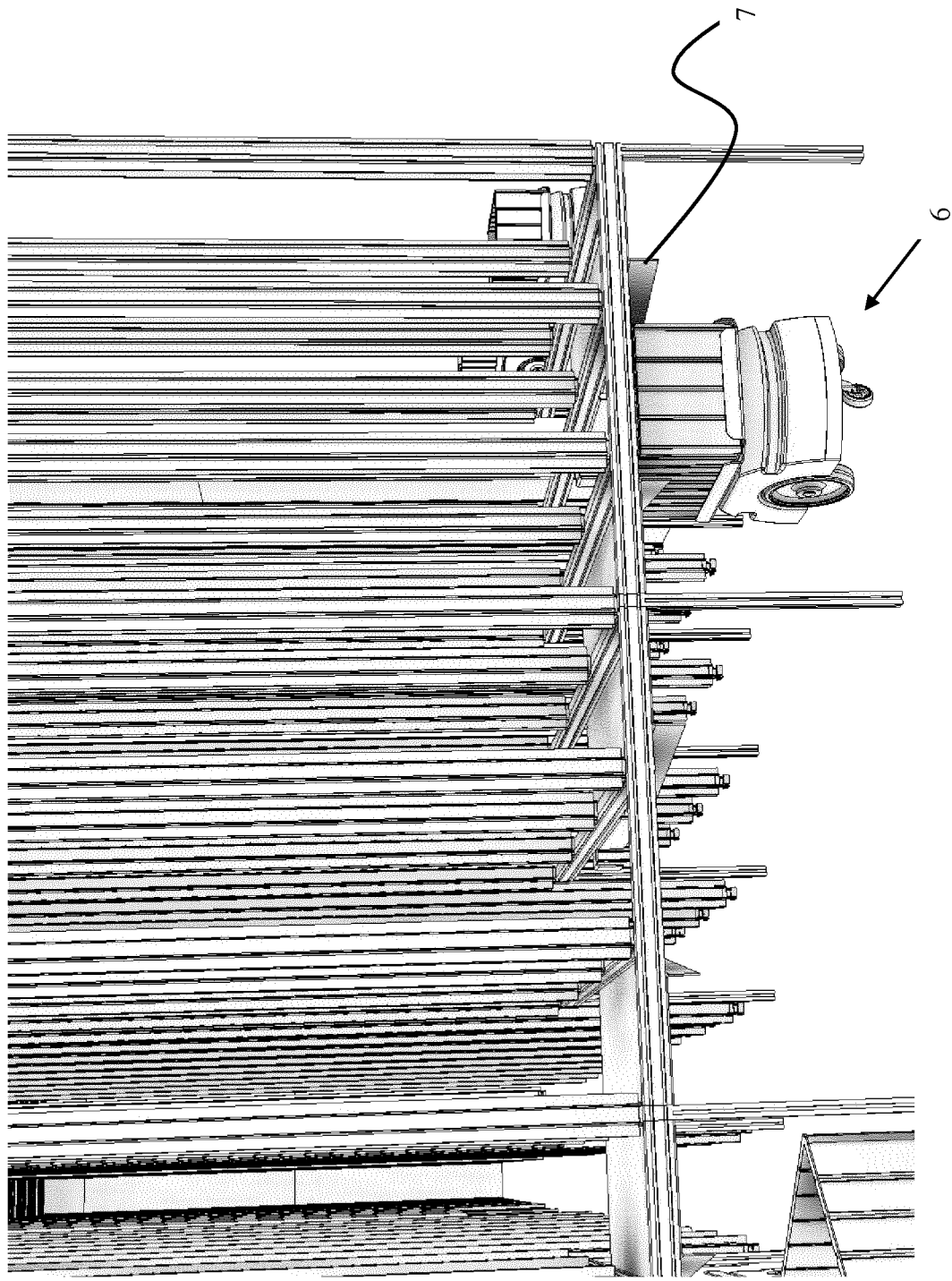

A third exemplary embodiment of a system according to the invention is shown in FIGS. 8-10. The main differentiating feature of the third embodiment in view of the storage system in FIGS. 5 to 7 is the construction/design of the guide barriers 7. In the third embodiment, the guide barriers are constructed from shaped plate elements 18 and connected at the lower end of the transfer columns. The guide barriers 7 feature a first 9 and second section 10 as discussed in connection with the second embodiment. A stopping element 8 is arranged at one end of the first section 9 distal from the second section 10. The stopping element will stop the container transfer vehicle 6 when it reaches the correct position below a transfer column 119,120.

The preferred arrangement and size of the transfer section 2 in any given storage system, as well as the positioning of the transfer columns 119,120, will depend on the size of the storage grid structure 104, the intended use of the storage system 1, the available space in which the storage system is arranged, the shape/layout of said space, etc. Independent of the specific positioning of the transfer section 2 within the storage grid structure, the storage system according to the invention will provide a number of advantages in view of the prior art storage systems, as disclosed throughout the present specification.

A schematic overview of an exemplary layout of an inventive storage system 1 is shown in FIG. 13. The exemplary layout illustrates some of the many advantages of the inventive storage system.

The storage system in FIG. 13 comprises a storage grid structure 104 featuring a transfer section 2 extending through the whole storage grid structure, i.e. the transfer sections extend from a first opening 11 in an external side 12 of the storage grid to a second opening 13 in an opposite external side 12'. In this manner, a container transfer vehicle 6 having received or delivered a storage container 106 via any of the multiple transfer columns 119,120 may exit the first 11 or the second opening 13 of the transfer section 2 depending on which pathway to a selected destination is most efficient.

The transfer floor 5 may in some embodiments interconnect the transfer columns 119,120 of the storage grid structure 104 with transfer columns 119,120 arranged in a separate (or second) storage grid structure, with a picking/stocking station 14, with a multi-use transfer floor area 15 and/or any other destination to which the transfer of a storage container is desired. The multi-use transfer floor area 15 may for instance be used for stocking large amounts of new items to the storage grid, as temporary parking for transfer vehicles carrying storage containers comprising high-demand items, and/or as a loading area for storage containers to enter the storage grids.

An area or section of the transfer floor 5 may also be used to accommodate container transfer vehicles 6 carrying storage containers 106 comprising high-demand items, i.e. a parking/storage section of the transfer floor. Such use may provide a highly efficient method of retrieving items that have a very high picking rate, i.e. that have a particularly high turnover. In prior art systems such high turnover items entail that the specific storage container(s) in which these items are stored is transferred back and forth between a storage column 105 and a picking/stocking station 14 more or less continuously. In the inventive storage system, items having a particularly high turnover may permanently (or at least intermediately) be stored in a storage container arranged on a transfer vehicle 6. In this manner, high turnover items may be accessed in a very short time, crowding at the transfer columns are further minimized and unnecessary use of the container handling vehicles 200,300 are avoided.

As is evident from the present disclosure, the inventive storage system provides a highly flexible container transfer and handling solution. Not only does the present solution facilitate the transfer of storage containers to or from the storage grid structure of an automated storage system, but it also provides for a simple and efficient solution for transfer of storage containers between separate storage grids, as well as between a storage grid and any location for further handling or processing of the storage containers and/or their content. The container handling capacity of the inventive storage system may easily be extended, and/or the function repurposed to accommodate any future changes in the requirements of a completed storage system. In addition, by having a transfer section and transfer floor as disclosed above, the container transfer and handling solution of the inventive storage system avoids any single point of failure which could disrupt the operation of the storage system.

REFERENCE NUMERALS

1 Storage system
2 Transfer section
3 Horizontal ceiling profile
4 Vertical support profile
5 Transfer floor
6 Container transfer vehicle
7 Guide barrier
8 Stopping element
9 First section of guide barriers
10 Second section of guide barriers
11 First opening (in an external side of a storage grid)
12 An external side of a storage grid
13 Second opening (in an external side of a storage grid)
14 Picking/stocking station
15 Multi-use transfer floor area
16 Vehicle body
17 Grid screen
18 Plate element
19 Laser sensor
20 Transfer port
21 Corner section
32a,32b Wheel arrangement
38 Container carrier
100 Framework structure
102 Upright members of framework structure, i.e. vertical column profiles
103 Horizontal members of framework structure
104 Storage grid, storage grid structure
105 Storage column
105' Storage column arranged above a transfer section
106 Storage container
107 Stack
108 Top rail grid, rail system
110 First set of parallel rails in first direction (X), top rails
111 Second set of parallel rails in second direction (Y), top rails
112 Grid column
115 Grid opening
119 Transfer column,
120 Transfer column
122 Grid cell
200 Prior art container handling vehicle
201,301 Wheel arrangement of prior art container handling vehicle
300 Second container handling vehicle
X First direction
Y Second direction
Z Third direction

The invention claimed is:

1. A storage system comprising:
a storage grid structure comprising:
vertical column profiles defining multiple storage columns, in which storage containers can be stored one on top of another in vertical stacks, the vertical column profiles being interconnected at their upper ends by top rails forming a horizontal top rail grid upon which container handling vehicles may move in two perpendicular directions to transport storage containers on the storage grid structure,
at least one transfer column, and
at least one horizontal transfer section;
a transfer floor configured to allow horizontal movement of one or more container transfer vehicles; and
a guidance system configured to guide movement of the one or more container transfer vehicles on the transfer floor, wherein the guidance system is connected to a lower end of the at least one transfer column,
wherein the at least one horizontal transfer section is arranged at a level below the horizontal top rail grid and extends from an external side of the storage grid structure to a first position below the at least one transfer column and comprises at least a section of the transfer floor,
wherein the transfer floor extends from the first position to a second position external to the storage grid structure,
wherein the at least one transfer column extends from the horizontal top rail grid to the at least one horizontal transfer section, and
wherein the at least one horizontal transfer section and the at least one transfer column are arranged such that the one or more container transfer vehicles are movable to the first position to receive a respective storage container and movable, with the respective storage container, to the second position.

2. A storage system according to claim 1, wherein the guidance system is arranged to guide the one or more container transfer vehicles between the first position and the second position on the transfer floor.

3. A storage system according to claim 1, further comprising the one or more container transfer vehicles, wherein the guidance system comprises at least one sensor on each of the one or more container transfer vehicles for determining a position of each of the one or more container transfer vehicles on the transfer floor or relative to the storage grid structure.

4. A storage system according to claim 3, wherein the at least one sensor comprises a sensor for detecting magnetism, receiving/transmitting radio signals, receiving/transmitting laser or receiving optic images.

5. A storage system according to claim 1, wherein the guidance system comprises guiding elements arranged to interact with the one or more container transfer vehicles and the guiding elements are arranged to guide the one or more container transfer vehicles to the first position directly below the at least one transfer column.

6. A storage system according to claim 5, wherein the guiding elements further comprise reflectors for reflecting a laser from a laser sensor on the one or more container transfer vehicles.

7. A storage system according to claim 5, wherein the guiding elements comprise a pair of guide barriers, wherein the pair of guide barriers comprises a first section arranged below the at least one transfer column, wherein the first section of the guide barriers are parallel and separated by a distance such that a container transfer vehicle, or a storage container arranged on a container carrier of the container transfer vehicle, may be accommodated between the guide barriers of the first section.

8. A storage system according to claim 7, wherein the pair of guide barriers comprises a second section extending from the first section, wherein the second section of the guide barriers are separated by a gradually increasing distance.

9. A storage system according to claim 1, further comprising the one or more container transfer vehicles, wherein each of the one or more container transfer vehicles has a horizontal periphery allowing two container transfer vehicles to pass each other when below two adjacent transfer columns.

10. A storage system according to claim 1, further comprising the one or more container transfer vehicles, each comprising a wheel arrangement for moving the one or more container transfer vehicles in at least two perpendicular directions on the transfer floor, wherein the wheel arrangement comprises at least two drive wheels being rotatable in opposite directions to allow each of the one or more container transfer vehicles to turn around itself.

11. A storage system according to claim 1, wherein the at least one horizontal transfer section comprises multiple horizontal ceiling profiles supported by vertical support profiles, and the vertical column profiles of the at least one transfer column extend from the horizontal top rail grid to the multiple horizontal ceiling profiles.

12. A storage system according to claim 11, wherein lower ends of the vertical column profiles of the at least one transfer column are supported by the multiple horizontal ceiling profiles.

13. A storage system according to claim 1, wherein the at least one transfer column provides a transfer port arranged at an upper level of the at least one horizontal transfer section, the transfer port arranged to allow vertical transfer of a storage container between the at least one transfer column and one of the one or more container transfer vehicles, and the upper level arranged at a height sufficient to allow a container transfer vehicle to travel within the at least one horizontal transfer section when carrying a storage container.

14. The storage system according to claim 1, each of the one or more container transfer vehicles comprising a container carrier for carrying a storage container, the container carrier being rotatably connected to a vehicle body of each of the one or more container transfer vehicles.

15. A method of retrieving a storage container from a storage system comprising:
a storage grid structure comprising:
vertical column profiles defining multiple storage columns, in which storage containers can be stored one on top of another in vertical stacks, the vertical column profiles being interconnected at their upper ends by top rails forming a horizontal top rail grid upon which container handling vehicles may move in two perpendicular directions to transport storage containers on the storage grid structure,
at least one transfer column,
at least one horizontal transfer section,
a transfer floor configured to allow horizontal movement of one or more container transfer vehicles; and
a guidance system configured to guide movement of the one or more container transfer vehicles on the transfer floor, wherein the guidance system is connected to a lower end of the at least one transfer column;
wherein the at least one horizontal transfer section is arranged at a level below the horizontal top rail grid and extends from an external side of the storage grid structure to a first position below the at least one transfer column and comprises at least a section of the transfer floor,
wherein the transfer floor extends from the first position to a second position external to the storage grid structure,
wherein the at least one transfer column extends from the horizontal top rail grid to the at least one horizontal transfer section, and
wherein the method comprises:
retrieving a storage container from one of the multiple storage columns by one of the container handling vehicles;
moving one of the container handling vehicles and the storage container to one of the at least one transfer column;
lowering the storage container to a container transfer vehicle arranged in the at least one horizontal transfer section at the first position below the at least one transfer column; and
moving the container transfer vehicle and the storage container to the second position.

16. A method according to claim 15, wherein the second position is selected from a position at a picking/stocking station or area, such that an operator or robot may access contents of the storage container while the storage container is arranged on the container transfer vehicle, a position below a transfer column in a transfer section of a second storage grid structure, and a position at a production facility, such as an assembly line or assembly station.

17. An automated storage and retrieval system comprising the storage system of claim 1 and at least one of:
the one or more container transfer vehicles; and
the container handling vehicles.

18. The storage system according to claim 17, each of the one or more container transfer vehicles comprising a container carrier for carrying a storage container and a wheel arrangement for moving each of the one or more container transfer vehicles in at least two perpendicular directions on the transfer floor.

19. A method according to claim 15, wherein each of the one or more container transfer vehicles comprises a container carrier for carrying a storage container, the container carrier being rotatably connected to a vehicle body of the container transfer vehicle.

* * * * *